(12) United States Patent
Ledbetter et al.

(10) Patent No.: US 11,568,292 B2
(45) Date of Patent: Jan. 31, 2023

(54) ABSOLUTE AND RELATIVE IMPORTANCE TREND DETECTION

(71) Applicant: Textron Innovations Inc., Providence, RI (US)

(72) Inventors: Matthew Curtis Ledbetter, North Richland Hills, TX (US); Silvio Mario Lopez, Arlington, TX (US); Drew Franklin Waller, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 255 days.

(21) Appl. No.: 16/912,626

(22) Filed: Jun. 25, 2020

(65) Prior Publication Data
US 2021/0406742 A1 Dec. 30, 2021

(51) Int. Cl.
*G06N 7/00* (2006.01)
*G06K 9/62* (2022.01)
(Continued)

(52) U.S. Cl.
CPC ............ *G06N 7/005* (2013.01); *G06F 17/18* (2013.01); *G06K 9/6215* (2013.01); *B64C 27/04* (2013.01)

(58) Field of Classification Search
CPC ....... G06F 17/18; G06K 9/6215; B64C 27/04; G05B 23/0235; G05B 23/0232;
(Continued)

(56) References Cited

U.S. PATENT DOCUMENTS 7,620,533 B2 * 11/2009 Bolt ................... G05B 23/0254
703/2
10,765,331 B2 * 9/2020 Morris ................. A61B 5/7264
(Continued)

FOREIGN PATENT DOCUMENTS

| CA | 2863098 A1 | 7/2013 | |
| CN | 107798149 A * | 3/2018 | ............. G06F 17/18 |
| DE | 19902326 A1 | 8/2000 | |

OTHER PUBLICATIONS

Ibidunmoye et al. "Adaptive Anomaly Detection in Performance Metric Streams". IEEE Transactions on Network and Service Management, vol. 15, No. 1, Mar. 2018. 15 Pages. (Year: 2018).*
(Continued)

*Primary Examiner* — Eunhee Kim
(74) *Attorney, Agent, or Firm* — Shackel, Bowen, McKinley & Norton, LLP

(57) ABSTRACT

In an embodiment, a method includes acquiring a current condition indicator of a condition indicator set associated with an operating condition of a machine, the condition indicator set indicating sensor readings associated with an operating element of the machine under the operating condition. The method also includes determining, by a data server, a relative trend significance over a trend window of the condition indicator set based, at least in part, on an evaluation of the trend window in relation to a historical window of the condition indicator set. The method also includes determining, by the data server, whether trend criteria associated with the operating element is satisfied, where the trend criteria may include criteria related to the relative trend significance. The method also includes executing, by the data server, an alerting process in response to the determining that the trend criteria is satisfied.

20 Claims, 15 Drawing Sheets

(51) Int. Cl.
*G06F 17/18* (2006.01)
*B64C 27/04* (2006.01)

(58) Field of Classification Search
CPC ........ G05B 23/024; G05B 2219/34477; G05B 23/0221; B64D 45/00; G06N 7/005
See application file for complete search history.

(56) References Cited

U.S. PATENT DOCUMENTS

| | | | |
|---|---|---|---|
| 2005/0165519 A1* | 7/2005 | Ariyur | G05B 23/0232 |
| | | | 701/3 |
| 2009/0144023 A1* | 6/2009 | Seem | G05B 23/0216 |
| | | | 702/182 |
| 2017/0314961 A1* | 11/2017 | Chen | G06F 11/3072 |
| 2019/0108691 A1* | 4/2019 | Tucker | G07C 5/006 |
| 2019/0353277 A1* | 11/2019 | Sundareswara | F16K 37/0041 |
| 2020/0112321 A1* | 4/2020 | Tohlen | H03M 7/30 |

OTHER PUBLICATIONS

Dempsey et al. "Investigation of Current Methods to Identify Helicopter Gear Health". 2007 IEEE Aerospace. 13 Pages. (Year: 2007).*

Tucker, Brian Edward, et al.; "Automated Trend Detection"; U.S. Appl. No. 16/547,182, filed Aug. 21, 2019; 63 pages.

\* cited by examiner

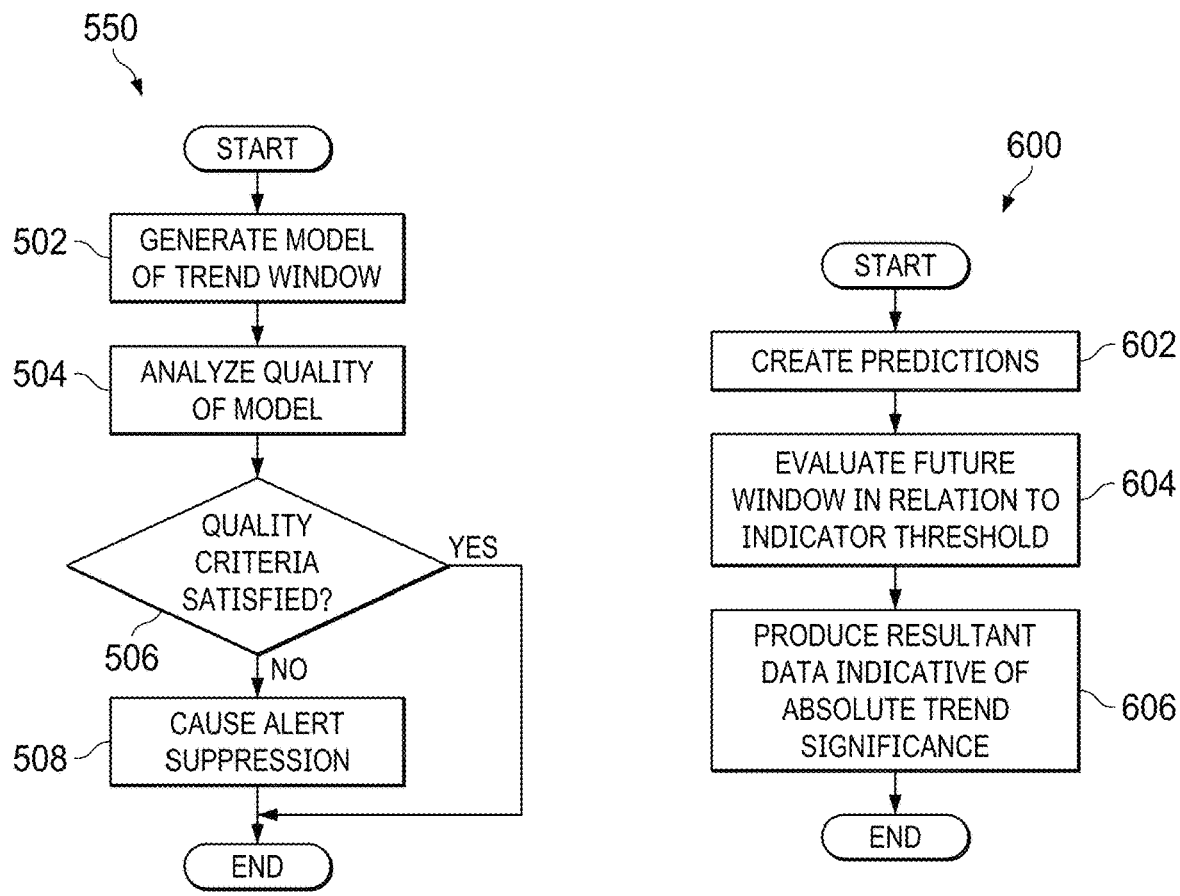
FIG. 5B
FIG. 6
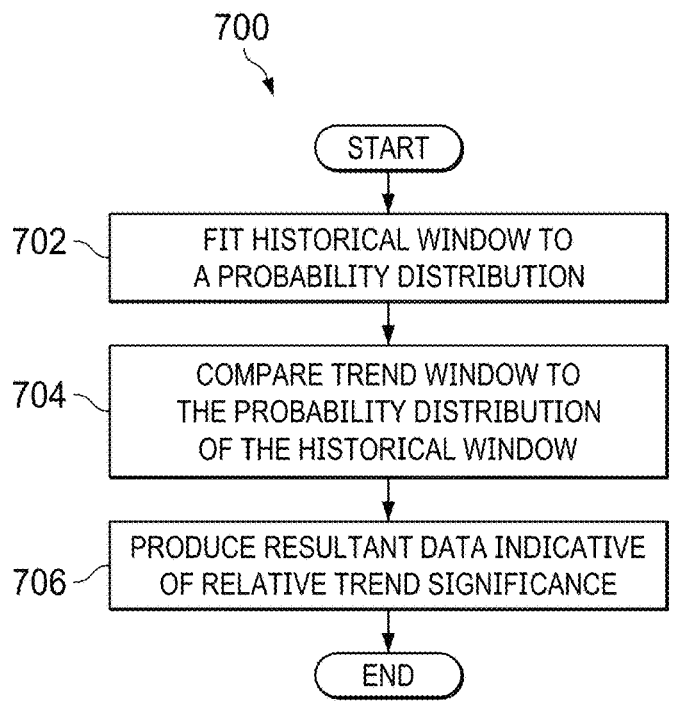
FIG. 7

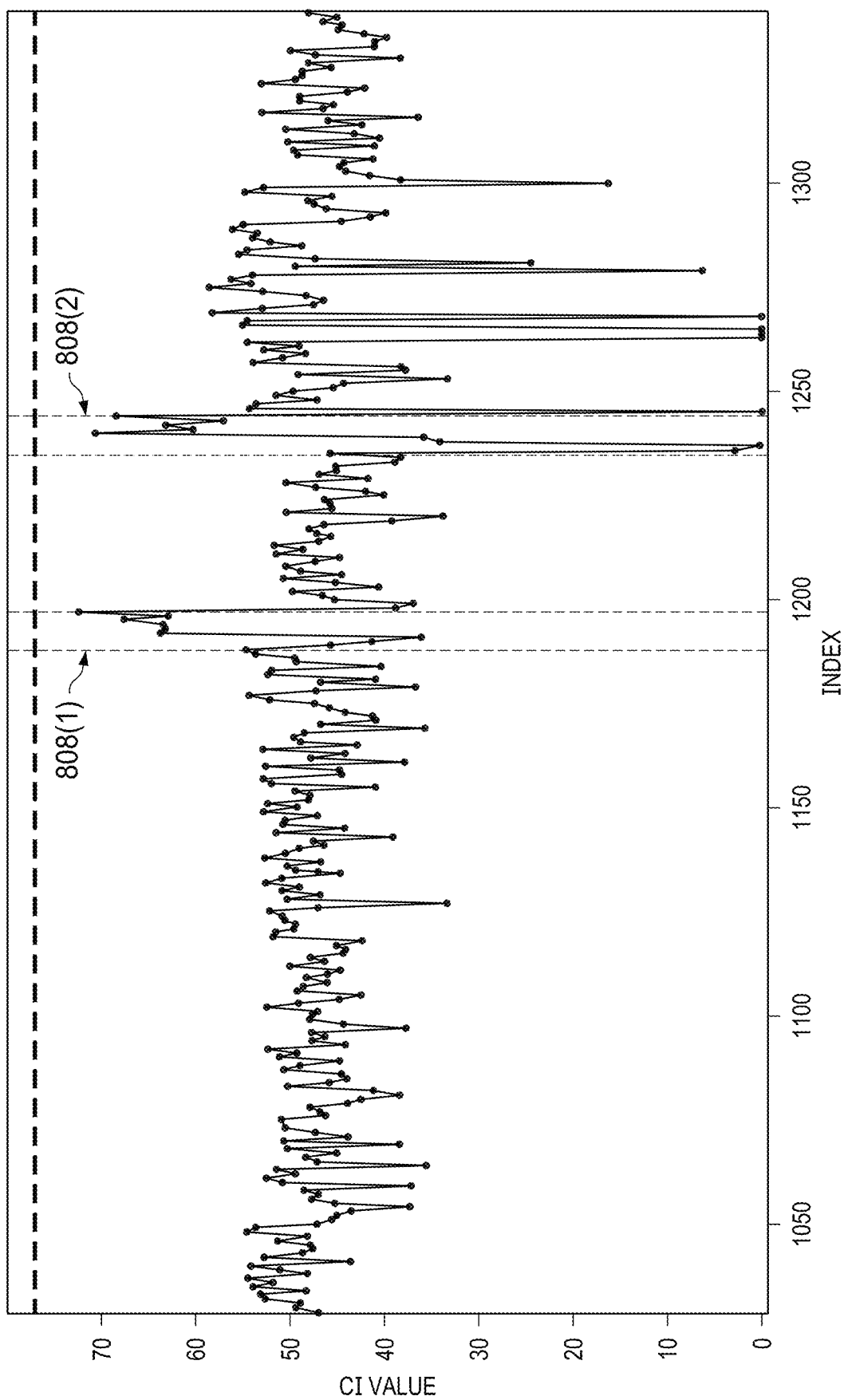

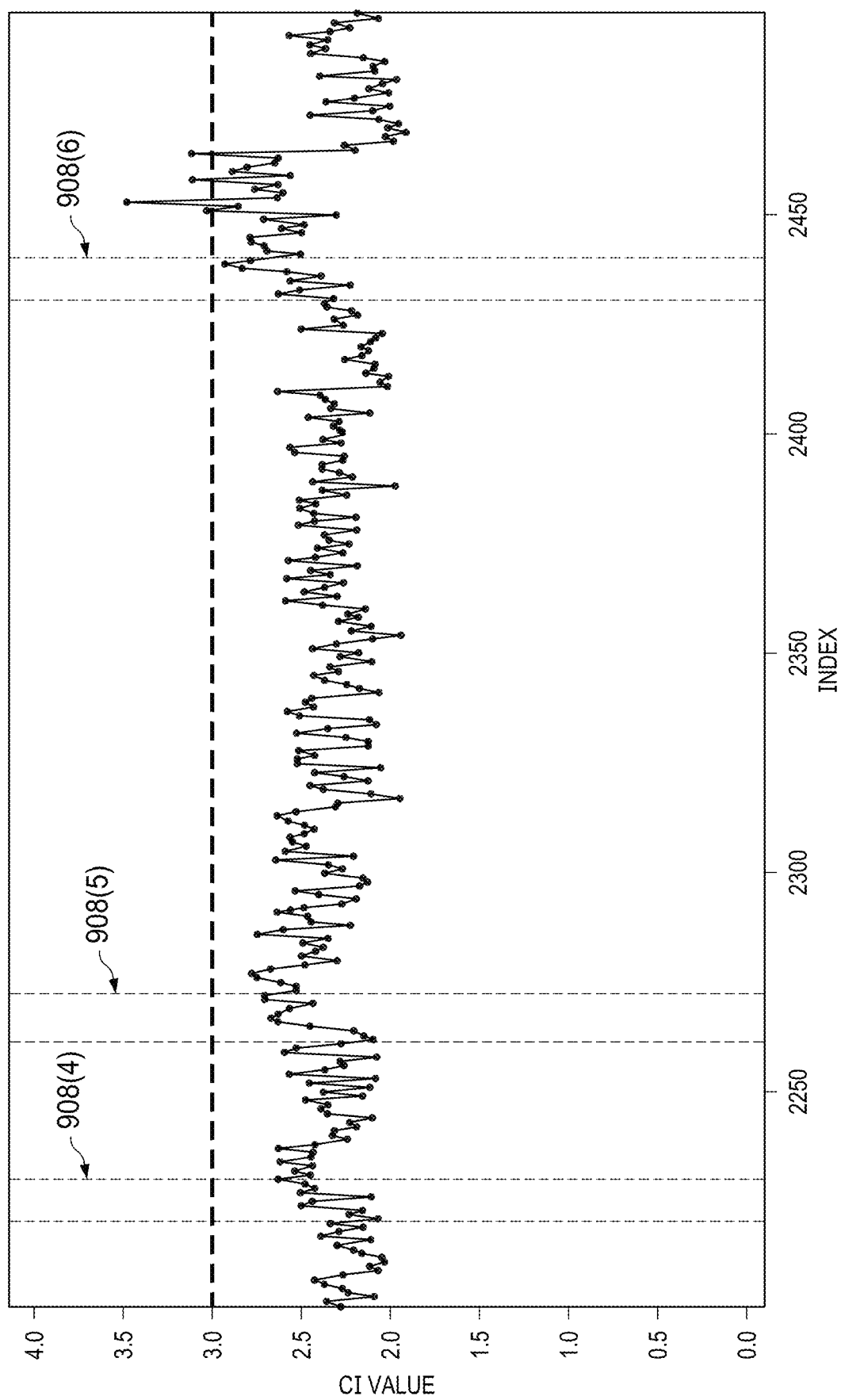

ABSOLUTE AND RELATIVE IMPORTANCE TREND DETECTION

BACKGROUND

Technical Field

The present disclosure relates generally to machine (e.g., vehicle) monitoring and more particularly, but not by way of limitation, to systems and methods for absolute and relative importance trend detection.

History of Related Art

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload. The systems for engines, transmissions, drive system, rotors, and the like, are critical to the safe operation of the rotorcraft in flight. The elements of system such as mechanical systems, electrical systems, hydraulic systems, and the like, are each subject to unique wear factors and monitoring, inspection or maintenance requirements.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, in an embodiment, a method includes acquiring a current condition indicator of a condition indicator set associated with an operating condition of a machine, the condition indicator set indicating sensor readings associated with an operating element of the machine under the operating condition. The method also includes determining, by a data server, a relative trend significance over a trend window of the condition indicator set based, at least in part, on an evaluation of the trend window in relation to a historical window of the condition indicator set, the historical window spanning a period prior to a start of the trend window. The method also includes determining, by the data server, whether trend criteria associated with the operating element is satisfied, where the trend criteria may include criteria related to the relative trend significance. The method also includes executing, by the data server, an alerting process in response to the determining that the trend criteria is satisfied. Other embodiments of this aspect include corresponding computer systems, apparatus, and computer programs recorded on one or more computer storage devices, each configured to perform the actions of the methods.

In another general aspect, in an embodiment, a computer system may include a processor and memory, where the processor and memory in combination are operable to perform a method. The method includes acquiring a current condition indicator of a condition indicator set associated with an operating condition of a machine, the condition indicator set indicating sensor readings associated with an operating element of the machine under the operating condition. The method also includes determining a relative trend significance over a trend window of the condition indicator set based, at least in part, on an evaluation of the trend window in relation to a historical window of the condition indicator set, the historical window spanning a period prior to a start of the trend window. The method also includes determining whether trend criteria associated with the operating element is satisfied, where the trend criteria may include criteria related to the relative trend significance. The method also includes executing an alerting process in response to the determining that the trend criteria is satisfied.

In another general aspect, in an embodiment, a computer-program product may include a non-transitory computer-usable medium having computer-readable program code embodied therein. The computer-readable program code is adapted to be executed to implement a method. The method includes acquiring a current condition indicator of a condition indicator set associated with an operating condition of a machine, the condition indicator set indicating sensor readings associated with an operating element of the machine under the operating condition. The method also includes determining a relative trend significance over a trend window of the condition indicator set based, at least in part, on an evaluation of the trend window in relation to a historical window of the condition indicator set, the historical window spanning a period prior to a start of the trend window. The method also includes determining whether trend criteria associated with the operating element is satisfied, where the trend criteria may include criteria related to the relative trend significance. The method also includes executing an alerting process in response to the determining that the trend criteria is satisfied.

BRIEF DESCRIPTION OF THE DRAWINGS

A more complete understanding of the method and apparatus of the present disclosure may be obtained by reference to the following Detailed Description when taken in conjunction with the accompanying Drawings wherein:

FIG. 5B illustrates an example of a process for generating and configuring data for use in determining trend significance;

FIG. 6 illustrates an example of a process for determining absolute trend significance;

FIG. 7 illustrates an example of a process for determining relative trend significance;

FIGS. 8A-C illustrate an example of trend analysis using condition indicator data;

FIGS. 9A-B illustrate an example of trend analysis using condition indicator data;

DETAILED DESCRIPTION

Figure 1:
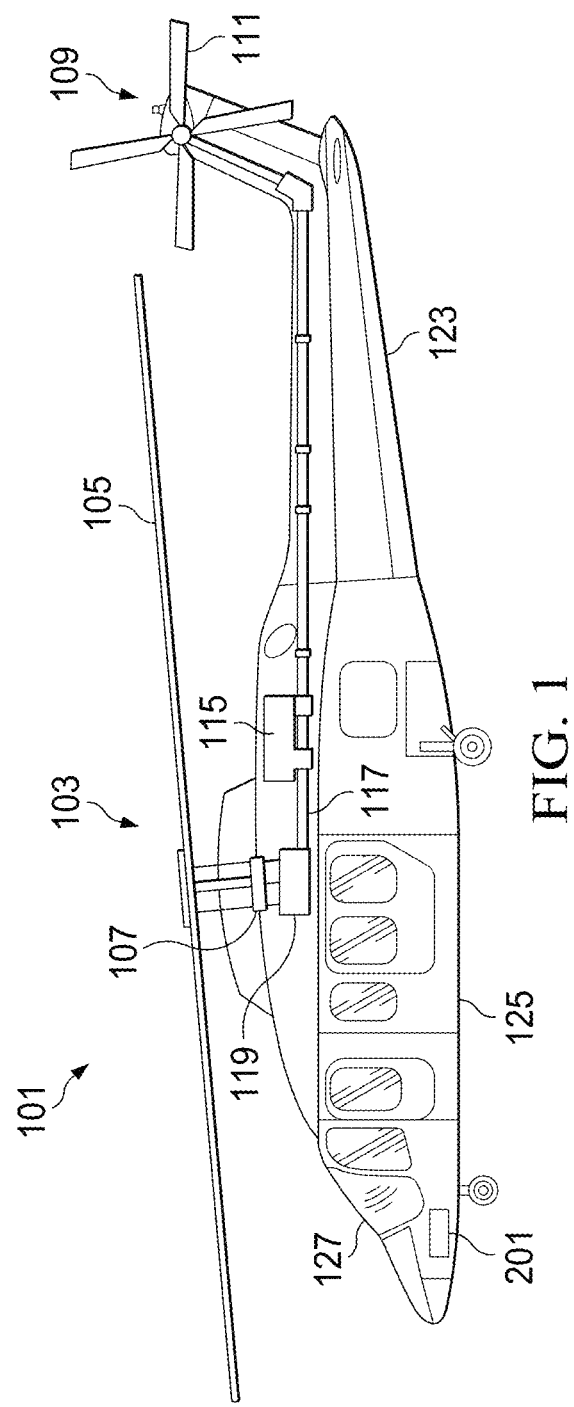
FIG. 1 illustrates a rotorcraft according to some embodiments.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, as used herein, the term "coupled" may include direct or indirect coupling by any means, including moving and/or non-moving mechanical connections.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures provide for default or suggested control positioning, or the like.

Embodiments of the system presented herein are directed to providing a system for measuring operating conditions in a machine such as, for example, a vehicle, and determining trends of the operating conditions in order to provide condition alerts to operators and technicians. In some embodiments, a reporting system receives signals from one or more sensors, and determines condition indicators that may indicate the magnitude or other properties of conditions such as vibration or the like. The system analyzes a series of condition indicators associated with a particular operating element to determine trends in the condition indicators. The trends may be used to determine that the condition indicators for a particular operating element have changed due to, for example, wear, damage, or the like. For example, vibration associated with a fuel pump, transmission gear, engine turbine, or the like, may be tracked, and trends associated with the same may indicate that the operating element may need inspection, repair or replacement.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the main rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely. In yet other contemplated embodiments, rotorcraft 101 could be configured as an unmanned vehicle, in which case cockpit 127 could be eliminated entirely in order to save space and cost.

Figure 2:
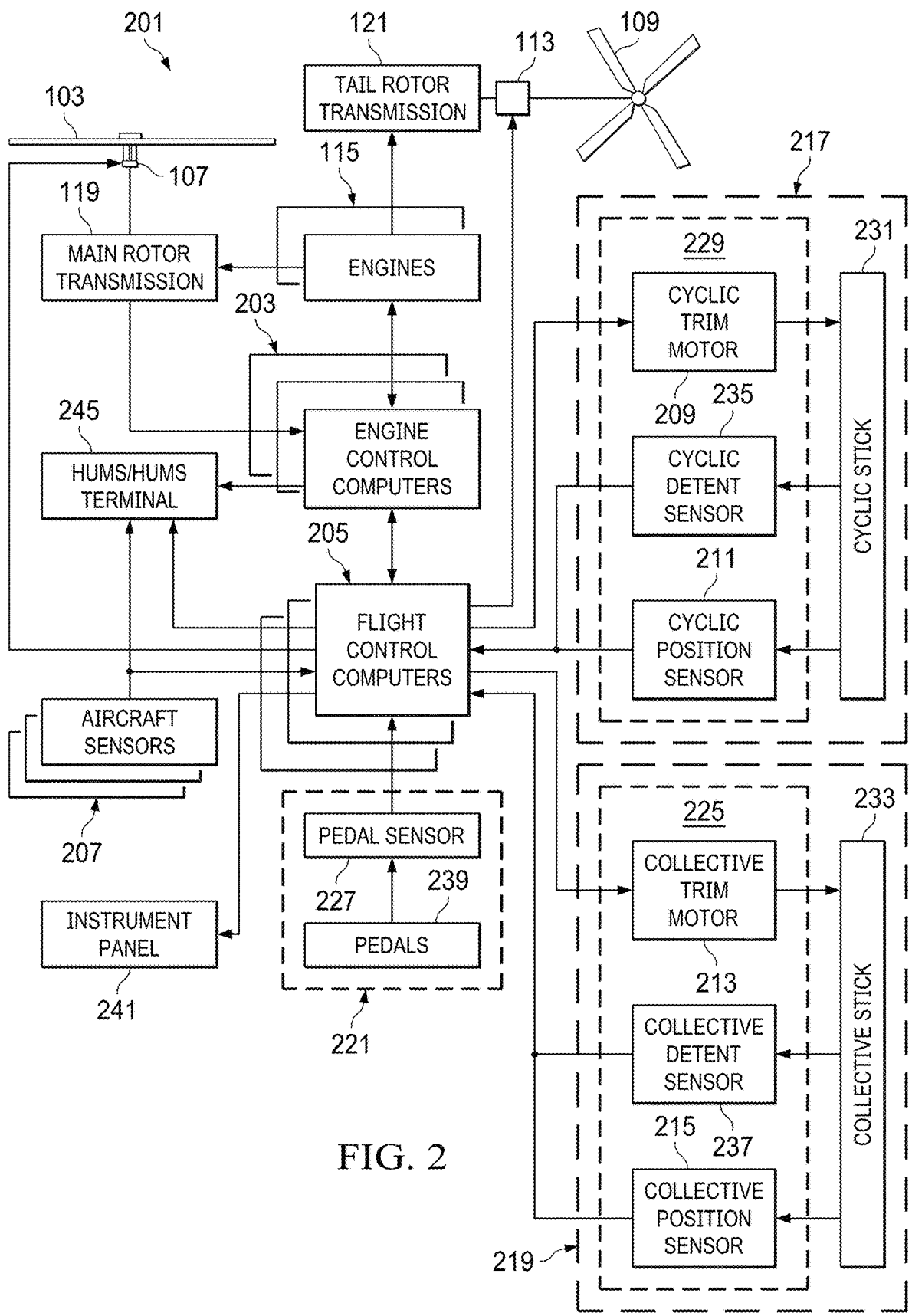
FIG. 2 illustrates a fly-by-wire flight control system for a rotorcraft according to some embodiments.

FIG. 2 illustrates a fly-by-wire flight control system 201 for a rotorcraft according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the fly-by-wire flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades in or to change the power output of the engines 115, as examples. Flight control devices include systems such as the swashplate 107, tail rotor actuator 113, and systems operable to control the engines 115. The fly-by-wire flight control system 201 may adjust the flight control devices independently of the flight crew in order to stabilize the rotorcraft, reduce workload of the flight crew, and the like. The fly-by-wire flight control system 201 includes engine control computers (ECCUs) 203, flight control computers (FCCs) 205, and aircraft sensors 207, which collectively adjust the flight control devices and monitors the rotorcraft during operation.

The fly-by-wire flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the fly-by-wire flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cues to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured revolutions per minute (RPM) of the main rotor blades.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 206 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. Additionally, the cyclic control assembly 217, collective control assembly 219 and/or pedal control assembly 221 may each have one or more detent sensors that determine whether the pilot is handling a particular control device. The FCCs 205 may provide different default control or automated commands to one or more flight systems based on the detent status of a particular stick or pilot control.

The aircraft sensors 207 may be in communication with the FCCs 205, a health and usage monitoring system (HUMS) 245. The aircraft sensors 207 may include sensors for monitoring operation of the rotorcraft, providing pilot data, providing operational data, or the like, and may include measuring a variety of rotorcraft systems, operating conditions, flight parameters, environmental conditions and the like. For example, the aircraft sensors 207 may include sensors for gathering flight data, and may include sensors for measuring airspeed, altitude, attitude, position, orientation, temperature, airspeed, vertical speed, and the like. The aircraft sensors 207 may include sensors relying upon data or signals originating external to the rotorcraft, such as a global positioning system (GPS) sensor, a very high frequency (VHF) omnidirectional range sensor, Instrument Landing System (ILS), and the like. The aircraft sensors 207 may also include sensors for reading operational data such as vibration, device rotational speed, electrical operating characteristics, fluid flows, or the like.

The fly-by-wire flight control system 201 may further include the HUMS 245 or a HUMS terminal. In some embodiments, the HUMS 245 collects data from fly-by-wire flight control system 201 elements for storage and later download, analysis, or the like. In some embodiments, the HUMS 245 may be connected to one or more aircraft sensors 207, FCCs 205, ECCUs 203, standalone sensors, sensors integrated into the HUMS, or other system components, or a combination of components. In some embodiments, the HUMS 245 may be separate from the FCCs 205, and may be implemented as a standalone system that communicates with, but that is operationally separate from, other elements of the fly-by-wire flight control system 201. The HUMS 245 may be a terminal that stores raw data from one or more aircraft components, and provides the raw data to a server for interpretation and analysis. In other embodiments, the HUMS 245 may interpret raw data to determine one or more condition indicators for a server or other system that analyzes or displays the data. In yet another embodiment, the HUMS 245 may analyze the raw data or condition indicators to determine a trend or problem with a data set, and may display or indicate the interpreted data, a warning, a system status, or like, on the instrument panel 241, on a dedicated display, through an audible warning, within another display such as a flight director display, though a tactile feedback system, or the like. The HUMS 245 may use data from the aircraft sensor 207 to determine an operating condition such as vibration. For example, the HUMS 245 may use a combination of vibration data and rotational speed data to generate synchronous vibration data or other transformed data types, which may be analyzed for trends indicating developing problems with specific components associated with the vibration data.

Figure 3:
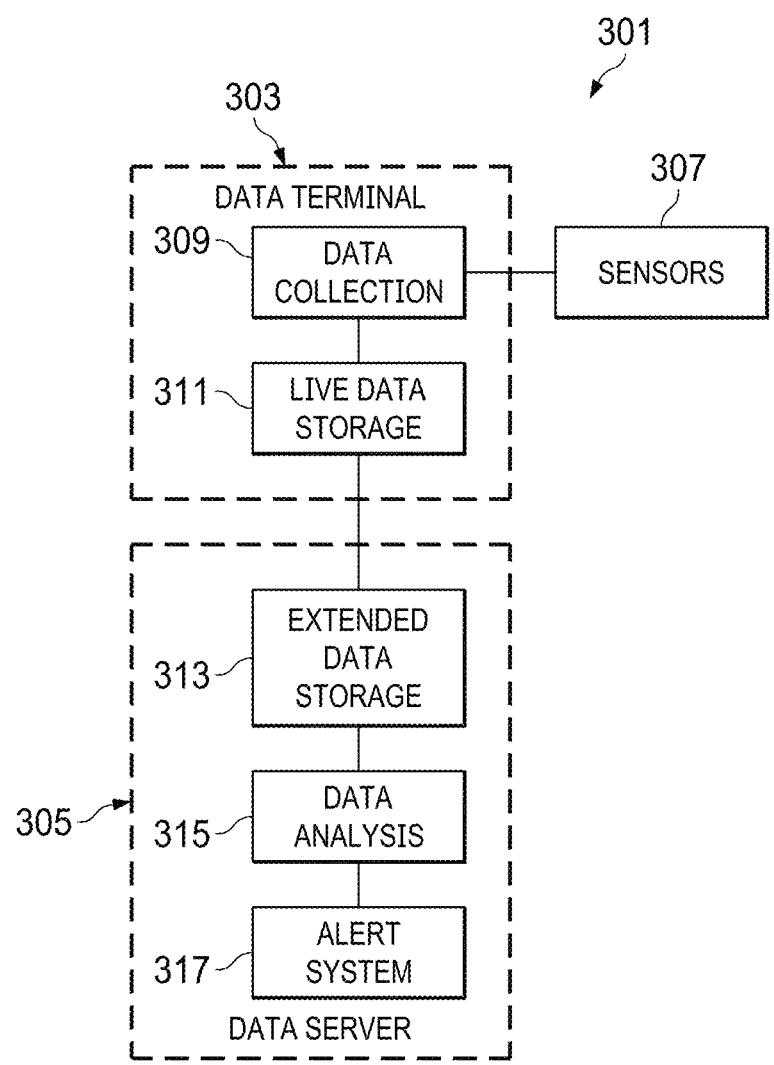
FIG. 3 illustrates an example of a system for trend detection in component condition indicator data.

FIG. 3 is a block diagram illustrating a HUMS 301 for trend detection of component condition indicator data according to some embodiments. The HUMS 301 may include a data terminal 303 that is connected to one or more sensors 307 and a data server 305. The sensors 307 may be aircraft sensors, as discussed above, and may take sensor readings and generate one or more sensor signals such as electrical signals, data elements, or the like, that indicate one or more operational conditions. For example, a sensor 307 may be a vibration sensor near an engine, gear set or transmission that detects vibrations from the local operating elements. In another example, the sensor 307 may be a voltage sensor or current detector that detects the voltage or current drawn by an electrical operating element such as a pump or a motor. In yet another example, the sensor 307 may be a pressure or flow sensor that detects the pressure of a hydraulic line or fuel line, the flow rate of a fluid such as fuel, coolant, oil hydraulic fluid, or the like.

The data terminal 303 may be a computer or other device that receives the sensor signals and stores the sensor signals locally for later analysis. In some embodiments, one or more of the HUMS terminal, the FCCs or ECCUs are data terminals 303. The data terminal 303 has a data collection element 309 that is a data handling element such as a processor, data collection circuit or device, or the like. In some embodiments, the data terminal 303 is a HUMS terminal that is a centralized device or standalone device that collects raw data from the sensors 307 and that generates condition indicator data from the raw data signals, or that collects condition indicator data from the sensors 307. In other embodiments, the data terminal 303 is a HUMS terminal that receives calculated or analyzed data such as alerts, trends, or the like from smart sensors 307 that determine condition indicators and perform analysis on the condition indicators. In yet another embodiment, the data terminal 303 may be, or include, a network of smart sensors 307 that act autonomously to collect data, and may determine condition indicators and perform some analysis of the condition indicator data. In such an embodiment, the smart sensors 307 may store the collected and calculated data or analysis for delivery directly to the data server 305. In some embodiments, the data collection element 309 also includes a communications circuit that receives the sensor signal from the sensors 307 and provides the raw sensor signal to the data collection element 309, which saves a condition indicator value based on the raw sensor signal in live data storage 311.

In some embodiments, the data terminal 303 stores the sensor signal as the condition indicator in the live data storage 311, and in other embodiments, the data terminal 303 processes the raw sensor signal to generate a condition indicator based on, or according to, the raw sensor signal before storing the condition indicator. The data terminal 303 may actively query a sensor 307, may receive a signal from a sensor 307, or may sample a signal from a sensor 307 to acquire a raw data signal or sensor signal. The data terminal 303 may acquire the data signal at a particular time in a flight or in response to one or more operating conditions meeting a predetermined set of criteria. Thus, each condition indicator data set may be associated with an operating condition. The data terminal 303 may acquire a data signal, by sampling a continuous or live signal, or querying a sensor, when the data terminal 303 detects that flight conditions or operating conditions meet one or more criteria. For example, the data terminal 303 may be an FCC, and may determine that the engines are in a maximum takeoff power (MTOP) state based on the throttle and collective settings, and may acquire a data signal indicating, for example, vibrations of one or more components of an engine, transmission, gear train, or the like, or for fuel flow, power generation, transmission torque, or the like. In another example, the data terminal 303 may determine that the rotorcraft is in a hover, in forward flight, or in another flight state, and may acquire the data signal during the flight state. Condition indicator data sets may be formed from measurements or condition indicators determined in relation to similar operating conditions to provide consistent data. For example, a first condition indicator data set may include condition indicators for a main rotor transmission gear during MTOP across multiple flights, while a second condition indicator data set may include condition indicators for the same main rotor transmission gear during hover across multiple flights.

The data terminal 303 may store the data signal, a sample of the data signal, condition indicators, and other sensor data or relevant identifying information in the live data storage 311. In some embodiments, the data signal or condition indicator may be tagged with a date, time, and operating condition indicator information when stored in the live data storage 311 for later transmission to the data server 305.

The data server 305 aggregates data from one or more data terminals 303. The data server 305 collects data in one or more condition indicator data sets for aggregation and trend analysis, and may provide a report, alerts or other information related to detected trends for individual condition indicators data sets. The data server 305 stores condition indicators, trend information, and the like, in extended data storage 313. A data analysis element 315 reads condition indicator information and perform trend analysis or detection on the condition indicators, and saves trend information generated by the trend analysis into the extended data storage.

The data server 305 may be, for example, a server that is remote from the data terminal 303, or may be local to, or the same device as the data terminal 303. In some embodiments, the data terminal 303 and data server 305 are both disposed in a vehicle such as a rotorcraft, and may both be implemented in one or more FCCs. In other embodiments, the data terminal 303 may be implemented in a device that is distinct from the device implementing the data server 305. For example, the data terminal 303 may be implemented in a dedicated monitoring computer or device using, for example, a purpose built processor, microcontroller, or the like, or may be implemented in an ECCU or other control computer, while the data server 305 is implemented in, for example, an FCC. In other embodiments, the data server 305 may be a diagnostic computer, remote server, or the like, that is separate from the vehicle on which the data terminal 303 is disposed. The data terminal 303 may transfer data to the data server 305 by responding to query from a maintenance computer, automatically transferring data to a remote data server 305 through a wireless connection, a manual transfer or download by a user using, for example, a non-transitory computer readable medium such as a universal serial bus (USB) stick or secure digital (SD) card, or the like.

The data terminal 303 collects a series of condition indicators for each operating condition that the data server 305 monitors. In some embodiments, the data server 305 receives raw sensor data or a data signal from the data terminal 303, or from the sensors 307, and performs analysis to isolate condition indicators from the data signal or raw sensor data. In other embodiments, the data terminal 303 performs the analysis and sends a processed data signal such as a condition indicator, data signal sample, or the like to the data server.

In some embodiments, the data signal may indicate more than one condition indicator, and processing the data signal may include isolating a condition indicator from the data signal. For example, the data terminal 303 may acquire a data signal from a vibration sensor adjacent to a main rotor transmission. The data signal may be a sample of the sensor data over a predetermined period of time, and may include data from multiple vibration sources. The data signal may be analyzed, by the data terminal 303 or the data server 305, by, for example, filtering using Fourier analysis or the like, to isolate signals for individual condition indicators. A Fourier transform may be applied to a data signal to transform the data signal into a filtered signal such as a frequency domain signal, which will indicate the amplitude of different subsignals making up the data signal. The subsignals at different frequencies may be associated with different condition indicators. For example, a first gear rotating at 300 RPM will correspond to a frequency signal at a first frequency in the filtered signal, while a second gear rotating at 2000 RPM will correspond to a frequency subsignal at a second frequency in the filtered signal. Thus, a first vibration condition indicator for the first gear will correspond to a first vibration subsignal having a frequency of about 5 Hz, while a second vibration condition indicator for the second gear will correspond to a second vibration subsignal having a frequency around 33.3 Hz. Thus, multiple condition indicators may be determined from a single data signal or a single sensor. In some embodiments, the sensors 307 may perform the processing of the data signals to determine the condition indicators, and may send, for example, a data packet or other data signal to data terminal 303. In other embodiments, the sensors 307 may send the data signal to the data collection element 309 of the data terminal 303, which processes the data signal to determine the condition indicators. In another embodiment, the sensors 307 may send the data signal to data terminal 303, which then passes the data signal to the data server 305 for determination of the condition indicators.

The data server 305 attempts to detect trends of condition indicators where the trend deviates from a normal or expected value. In some embodiments, the data server 305 has an alert system 317 that provides an alert indicating that a trend of a condition indicator has exceeded a particular threshold such as a static indicator threshold. The alert system 317 may provide the alert to a vehicle operator, a maintenance technician, a fleet operator, a vehicle, owner, or to an automated system. The alert system 317 may be disposed in the vehicle, and include a cockpit indicator that is an audible indicator such as a buzzer or voice prompt provided through a flight director system, a graphic warning such as a note or other warning on a graphic screen, instrument screen, flight director screen, or the like, or may be provided as a dedicated visual indicator such as a dedicated warning light, lamp, or the like. In other embodiments, the alert system 317 may be remote from the vehicle, and may provide an automated alert by generating a report with a list of conditions of concern, automatically messaging a technician or owner, providing an indicator on a monitoring system, or the like. For example, a data server 305 may be a monitoring server at a fleet operator, and, as each vehicle returns to the fleet base, the vehicle may automatically transmit condition indicator data to the data server by way of a wireless link, or through a maintenance computer connected to the vehicle by a technician. The data server 305 may aggregate the newly received condition indicator data for one or more monitored performance parameters with existing condition indicator or trend data for the relevant performance parameter, and analyze the data for trends. Upon detecting that a trend or condition data for a particular operating parameter has exceeded a particular threshold such as a static trend threshold or an adaptable trend threshold, the data server 305 may generate one or more alert signals, which may include generating a problem report indicating that a particular vehicle system, element or the like needs to be inspected, replaced, or otherwise addressed by a technician. The report may be generated in response to determining that the trend indicates a problem, or in response to query for the report. In other embodiments, the alert system 317 may generate an alert signal that automatically messages a fleet operator, vehicle owner, maintenance technician, or the like by email, short messaging system (SMS) message, text message, automated voice call, or the like. In other embodiments, the alert system 317 may generate the alert signal to display an indicator on a management web page, maintenance checklist, vehicle record, or the like. In some embodiments, the alert may indicate a severity of a problem, with the data server 305 comparing the trend data to multiple different thresholds. Thus, the alert may indicate the severity of a trend for a particular vehicle element. In some embodiments, a vehicle-born alert and a remote alert may be used in combination. For example, a maintenance or inspection alert may be generated for a transmission gear when trend data indicates that vibration of the gear has exceeded a threshold such as a static trend threshold or an adaptable trend threshold, indicating that the transmission gear should be inspected for possible damage. The alert system 317 may generate a warning or problem message such as automated remote message and/or an in-cockpit warning when the trend data exceeds a higher threshold, indicating that further use of the gear should be avoided. Thus, the alert system 317 may take different alert actions based on the comparison of the trend data to different thresholds.

The data server 305 may use data from one or more data collection points, such as sensors 307, data collection elements 309, data terminals 303, or like, to determine trend significance in recent samples for a particular condition indicator. The data server 305 can use trend significance to detect changes in the condition indicator well before a static indicator threshold is crossed. While a static indicator threshold may be lowered to detect potential problems in a condition indicator earlier, this may lead to false alarms for noisier signals. Thus, trend detection using various principles of trend significance tends to provide earlier detection, with fewer false alarms, than static indicator thresholds. Examples will be described relative to FIGS. 4-7, 8A-C, 9A-B, 10 and 11A-B.

Figure 4:
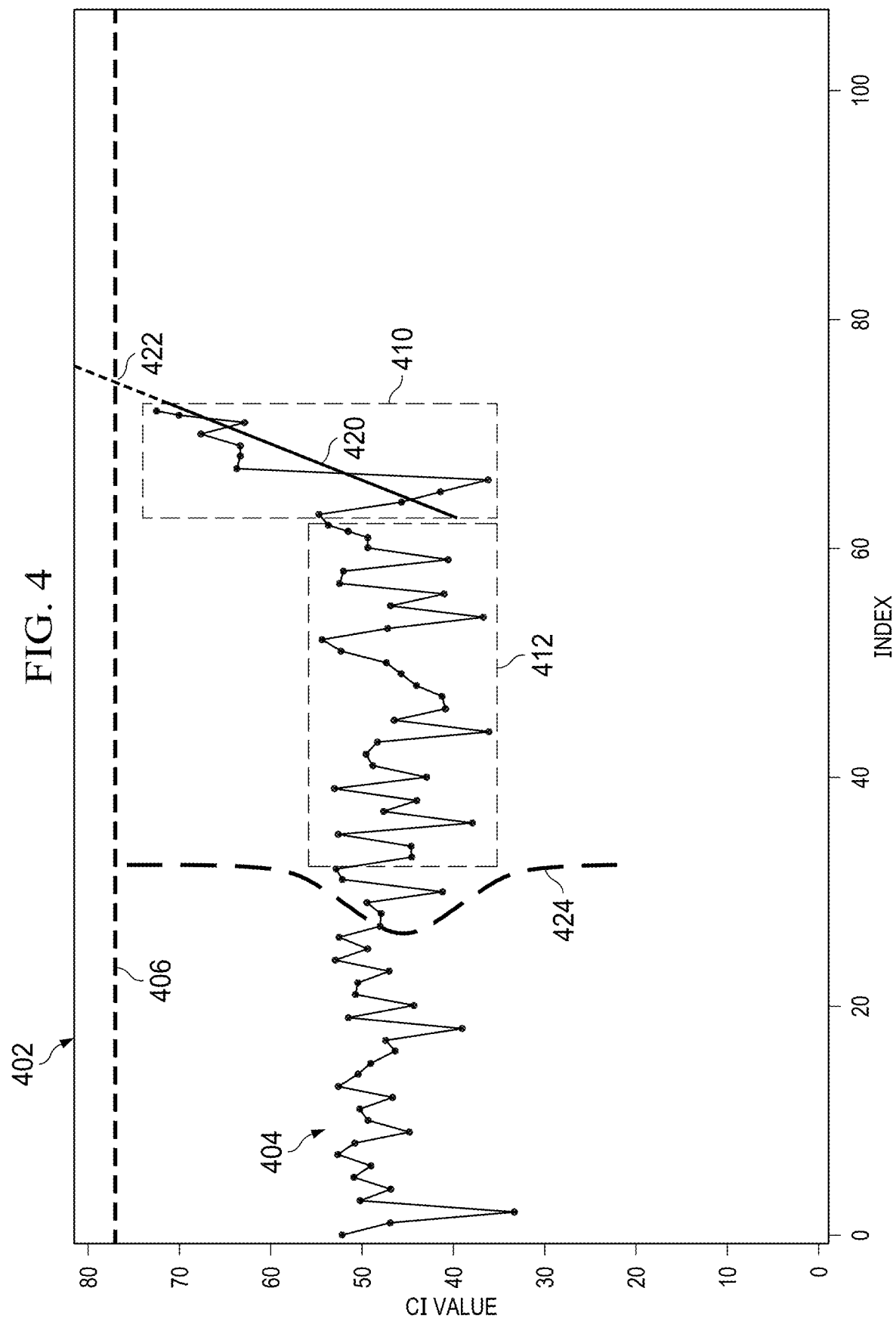
FIG. 4 illustrates an example of trend detection.

FIG. 4 is a graph 402 that illustrates an example of trend detection that can be performed, for example, by the data server 305 of FIG. 3. The graph 402 includes condition indicator data 404 and an indicator threshold 406. The indicator threshold can be, for example, a static or adaptable indicator threshold for the condition indicator data 404. In various embodiments, a trend window 410 and a historical window 412 can each be defined by the data server 305 to include a rolling subset of the condition indicator data 404.

For simplicity of description, the rolling subset that is included in each of the trend window 410 and the historical window 412 will be described in terms of number of samples. Despite such terminology, it should be appreciated that, in actuality, each window referenced herein can be defined in any suitable fashion that can be resolved to specific samples. For example, the trend window 410 and the historical window 412 can be defined in terms of segments of time (e.g., a rolling range of seconds, minutes, hours, etc.), in which case the trend window 410 and the historical window 412 would each include samples for a corresponding segment of time. In similar fashion, the trend window 410 and the historical window 412 can be defined in terms of segments of operational time (e.g., vehicle or flight hours).

In an example, the trend window 410 can include a configurable number of most recent samples (e.g. 10, 20, 30, or any other suitable number). The historical window 412 generally spans a period prior to a start of the trend window 410, and like the trend window 410, can include a configurable number of samples. In some embodiments, the historical window 412 can be defined in relation to the trend window 410. For example, in the embodiment illustrated in FIG. 4, the historical window 412 ends immediately prior to a start of the trend window 410, such that the last sample in the historical window 412 is immediately followed by the first sample in the trend window 410. Although the trend window 410 and the historical window 412 are shown to be non-overlapping windows in FIG. 4, it should be appreciated that, in other embodiments, the trend window 410 and the historical window 412 may be permitted to overlap, with the historical window 412 still spanning a period prior to the start of the trend window 410.

In various embodiments, the data server 305 can determine trend significance over the trend window 410 based, at least in part, on an evaluation of the trend window 410 in relation to the indicator threshold 406, often referred to herein as an absolute trend significance. For example, the data server 305 can determine the absolute trend significance by creating predictions 422 based on a model 420 and evaluating the predictions 422 in relation to the indicator threshold 406. Examples of determining absolute trend significance will be described in greater detail with respect to FIGS. 5A-B and 6.

In addition, or alternatively, the data server 305 can determine trend significance over the trend window 410 relative to other data in the condition indicator data 404, often referred to herein as a relative trend significance. For example, the data server 305 can determine relative trend significance based, at least in part, on an evaluation of the trend window 410 in relation to the historical window 412. In many cases, the relative trend significance can utilize a fit of the historical window 412 to a cumulative distribution 424. The cumulative distribution 424 can utilize, for example, any probability distribution such as a normal distribution. Examples of determining relative trend significance will be described in greater detail with respect to FIGS. 5A-B and 7.

Figure 5A:
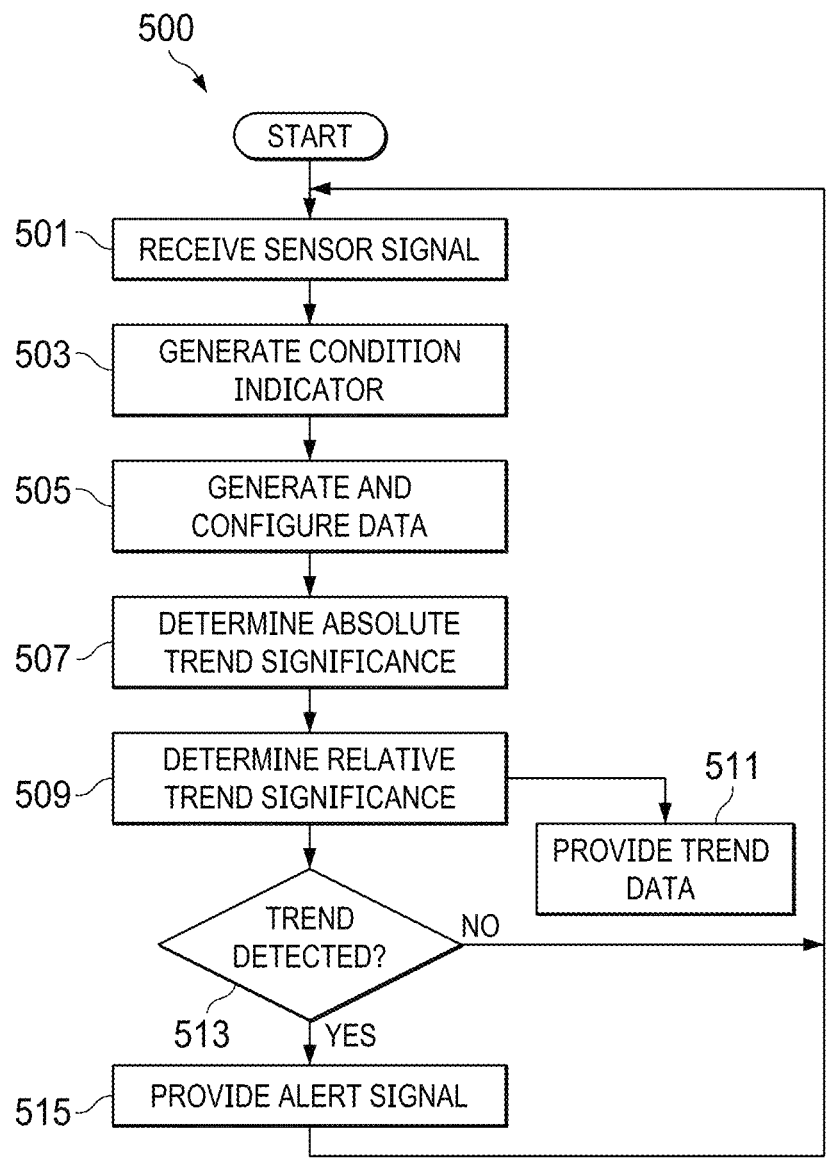
FIG. 5A illustrates an example of a process for providing an alert signal for condition indicator trends.

FIG. 5A illustrates an example of a process 500 for providing an alert signal for condition indicator trends according to some embodiments. In certain embodiments, the process 500 can be executed, for example, by the data server 305 of FIG. 3, the data terminal 303 of FIG. 3, a component of the foregoing, or another component. The process 500, or portions thereof, may be embodied in a software program stored on a non-transitory computer-readable storage medium that is executed by a processor of the data terminal 303 and a processor of the data server 305. The process 500 can also be executed generally by the HUMS 301 of FIG. 3. Although the process 500 can be executed by any number of different components, to simplify discussion, the process 500 will be described as being performed by the data server 305 and/or other particular components of FIG. 3. For simplicity of description, the process 500 will be described with reference to the graph 402 of FIG. 4.

At block 501, the data server 305, or another component, receives a sensor signal. In some embodiments, the sensor 307 generates the sensor signal and provides the sensor signal to a data collection element 309 in the data terminal 303. The sensor 307 may continuously send the sensor signal for sampling by the data collection element 309, may send the sensor signal in response to a query, activation signal or the like, may send the sensor signal in response to a predetermined condition, may store the sensor signal for processing thereon, or may send or provide the signal according to another procedure.

At block 503, the data server 305 generates a condition indicator. In some embodiments, one or more condition indicators are generated from the sensor signal, with different condition indicators being derived from different subsignals in the sensor signal. In other embodiments, multiple readings from the sensor 307, or readings from multiple sensors similar to the sensor 307, may be combined or otherwise used to generate the condition indicator. For example, data signals from an accelerometer and from a tachometer may be used to generate synchronous time average vibration data or condition indicators. Additionally, or alternatively, the condition indicator may be generated at the sensor 307, at the data terminal 303 or at the data server 305. Each condition indicator that is generated through iterations through the block 503 is added to a condition indicator set, represented in FIG. 4 as the condition indicator data 404, in relation to its associated index and/or time.

At block 505, the data server 305 generates and configures data for use in determining trend significance. In some embodiments, the block 505 can include generating, for example, a model of the trend window 410. An example of functionality that can be performed at the block 505 will be described in relation to FIG. 5B. In some embodiments, such as embodiments in which trend significance is determined without models or other generated data, the block 505 can be omitted.

At block 507, the data server 305 determines an absolute trend significance over the trend window 410, optionally using data, if any, generated at the block 505. In a typical embodiment, the absolute trend significance is based, at least in part, on an evaluation of the trend window 410 in relation to the indicator threshold 406. As described previously, the determination of the absolute trend significance can utilize the model 420 and the predictions 422. Examples of determining the absolute trend significance will be described in greater detail relative to FIG. 6.

At block 509, the data server 305 determines a relative trend significance over the trend window 410, optionally using data, if any, generated at the block 505. In a typical embodiment, the relative trend significance is based, at least in part, on an evaluation of the trend window 410 in relation to the historical window 412. As described previously, the trend window 410 and the historical window 412 can each include a rolling subset of the condition indicator data 404 as the data server 305 continues to iterate through the process 500. Examples of determining the relative trend significance will be described in greater detail relative to FIG. 7.

At block 511, in some embodiments, data related to the absolute trend significance and/or the relative trend significance are provided. For example, such data may be provided by or through the data server 305 as part of a chart, report, display or the like.

At decision block 513, the data server 305 determines whether a trend is detected. In certain embodiments, the data server 305 can determine whether a trend is detected based on an evaluation of trend criteria stored or established thereon, where a trend is detected if the trend criteria is satisfied. The trend criteria can include criteria related to the absolute trend significance from the block 507, criteria related to the relative trend significance from the block 509, other criteria, combinations of the foregoing, and/or the like. In certain embodiments, satisfaction of the trend criteria can require, for example, satisfaction of at least criteria related to the relative trend significance and criteria related to absolute trend significance.

If a determination is made at the decision block 513 that a trend is detected, an alerting process is executed at the block 515. In some cases, as will be described in greater detail relative to FIG. 5B, alerts based on unreliable models or data can be suppressed at the block 515. In other cases, an alert signal is provided at block 515. In cases in which an alert signal is provided at the block 515, in some embodiments, the alert system 317 or the data server 305 may activate an in-vehicle alert, for example, by lighting a trouble lamp in a vehicle cockpit, displaying a warning message on a cockpit display, or by providing an out-of-vehicle message by automatically message a fleet operator, vehicle owner, maintenance technician, or the like by email, short messaging system (SMS) message, text message, automated voice call, or the like. In some embodiments, the alert system 317 may generate an alert and display an indicator on a management web page, maintenance checklist, vehicle record, or the like. In some embodiments, the alert signal is a problem report generated by the data server 305 indicating a problem or warning for the system or element related to the condition indicators. Additionally, or alternatively, the alert system 317 may indicate a level of problem or alert, for example, by providing an alert severity. In some embodiments, an in-vehicle alert and a remote alert may be used in combination.

The collection of sensor data and the determinations absolute trend significance and relative trend significance may be repeated any number of times and performed periodically or continuously. Thus, for example, from block 515, the process 500 can return to the block 501 and operate as described previously The process 500 can similarly return to the block 501 if, for example, a determination is made at the decision block 513 that a trend is not detected. In various embodiments, the process 500 can execute continuously until it is terminated by a user or suitable stop criteria is satisfied such as, for example, vehicle shutdown, mission completion, and/or the like.

For illustrative purposes, the process 500 was described above as including determinations of both relative trend significance and absolute trend significance. In various embodiments, only one of relative trend significance or absolute trend significance may be sufficient or otherwise desirable, with the other being omitted. In these cases, the process 500 can omit either the block 507 or the block 509, as appropriate, and the trend criteria described relative to the decision block 513 can similarly exclude any criteria related to the omitted block.

FIG. 5B illustrates an example of a process 550 for generating and configuring data for use in determining trend significance. In various embodiments, the process 550 can be performed as all or part of the block 505 and/or the block 515 of FIG. 5A. In certain embodiments, the process 550 can be executed, for example, by the data server 305 of FIG. 3, the data terminal 303 of FIG. 3, a component of the foregoing, or another component. The process 550, or portions thereof, may be embodied in a software program stored on a non-transitory computer-readable storage medium that is executed by a processor of the data terminal 303 and a processor of the data server 305. The process 550 can also be executed generally by the HUMS 301 of FIG. 3. Although the process 550 can be executed by any number of different components, to simplify discussion, the process 550 will be described as being performed by the data server 305 and/or other particular components of FIG. 3. For simplicity of description, the process 550 will be described with reference to the graph 402 of FIG. 4.

At block 502, the data server 305 generates the model 420 of the trend window 410. In various embodiments, as illustrated in FIG. 4, the model 420 can be a linear regression model generated according to least squares linear regression (e.g., ordinary least squares, weighted least squares, or generalized least squares). In various embodiments, the model 420 can also be a non-linear model such as polynomial, exponential, or the like. In addition, or alternatively, the model 420 can be a model based on machine learning such as a neural network. Other examples and variations will be apparent to one skilled in the art after a detailed review of the present disclosure.

At block 504, the data server 305 analyzes a quality of the model 420. It should be appreciated that the quality analysis at the block 504 can be tailored to a type of the model 420 (e.g., linear, machine learning, etc.). In an example, continuing the above example of the linear regression model, the block 504 can include analyzing the linear regression model using a coefficient of determination. In Equation 1, a coefficient of determination $R^2$, which is represented as a square of Pearson's correlation coefficient R, is computed for the linear regression model, where the linear regression model includes n pairs of x and y values.

$$R^2 = \left( \frac{n(\sum xy) - (\sum x)(\sum y)}{\sqrt{\left[n\sum x^2 - (\sum x)^2\right]\left[n\sum y^2 - (\sum y)^2\right]}} \right)^2 \qquad \text{Htxdwlrq\#4}$$

At decision block 506, the data server 305 determines whether the model 420 satisfies quality criteria. In certain embodiments, the quality criteria can be stored or established on the data server 305 or otherwise available to the data server 305. Continuing the above example of the linear regression model, the coefficient of determination $R^2$ may be considered to satisfy the quality criteria if it is greater than a quality threshold such as, for example, 0.5 or another suitable value.

If it is determined at the decision block 506 that the model 420 satisfies the quality criteria, the process 550 can. In certain embodiments, the fact that the model 420 satisfies the quality criteria means that the model 420 is deemed suitable for use, for example, in determining absolute trend significance, determining relative trend significance, and/or alerting based on one or both of the foregoing. According to this example, the process 550 can end without any changes to system operation or alerting.

If it is determined at the decision block 506 that the model 420 does not satisfy the quality criteria, the data server 305 can cause alert suppression at block 508. In certain embodiments, the fact that the model 420 does not satisfy the quality criteria can mean that analyses based on the model 420 are unreliable, and hence that alerting based on such analyses is also unreliable. Suppression of these alerts can serve to minimize false alarms and to increase overall alerting effectiveness.

In various embodiments, alert suppression at the block 508 can be implemented to the extent to which supporting analyses rely upon the model 420. For example, with reference to the block 507 of FIG. 5A, in embodiments in which absolute trend significance is determined using the model 520, the data server 305 can cause alert suppression for: (a) detected trends that are solely based on absolute trend significance; and/or (b) detected trends that are based on absolute trend significance in combination with other criteria. Similarly, with reference to the block 509 of FIG. 5A, in embodiments in which relative trend significance is determined using the model 520, the data server 305 can cause alert suppression for: (a) detected trends that are solely based on relative trend significance; and/or (b) detected trends that are based on relative trend significance in combination with other criteria.

In certain embodiments, alert suppression at the block 508 can be implemented in various fashions. For example, in some cases, with reference to the process 500A, the data server 305 can cause the alert signal generation described relative to the block 515 to be omitted, or not performed, as to any detected trends which should not produce alerting. In such cases, the functionality of the block 508 can be performed, at least in part, during the alerting process at the block 515 of FIG. 5A. In another example, the data server 305 can skip or omit processes that rely upon on the model 420. In particular, the data server 305 could skip or omit the blocks 507 and/or 509 of the process 550 to the extent that such blocks rely upon or use the model 420. According to this example, trends based on the model 420 would not be detected and, therefore, corresponding alert signals based on such trends would likewise not be generated at the block 515. Other examples and variations will be apparent to one skilled in the art after a detailed review of the present disclosure.

FIG. 6 illustrates an example of a process 600 for determining absolute trend significance according to some embodiments. In various embodiments, the process 600 can be performed as all or part of the block 507 of FIG. 5A. In certain embodiments, the process 600 can be executed, for example, by the data server 305 of FIG. 3, by the data terminal 303 of FIG. 3, by a component of the foregoing, or by another component. The process 600, or portions thereof, may be embodied in a software program stored on a non-transitory computer-readable storage medium that is executed by a processor of the data terminal 303 and a processor of the data server 305. The process 600 can also be executed generally by the HUMS 301 of FIG. 3. Although the process 600 can be executed by any number of different components, to simplify discussion, the process 600 will be described as being performed by the data server 305 and/or other particular components of FIG. 3. For simplicity of description, the process 600 will be described with reference to the graph 402 of FIG. 4.

At block 602, the data server 305 creates the predictions 422. The block 602 can involve predicting a plurality of data points of a future window of a condition indicator set, such as future values of the condition indicator data 404, using the model 420. In various embodiments, the future window can be a window of the same size as the trend window 410. For example, if the trend window 410 were to include ten data points, the future window could include predictions for the next ten data points following the trend window 410. The future window can also have a different size than the trend window 410. Continuing the above example of the linear regression model, the plurality of data points of the future window can be calculated according to a linear equation represented in the linear regression model.

At block 604, the data server 305 evaluates the plurality of data points of the future window in relation to the indicator threshold 406. For example, the data server 305 can determine how many and/or what proportion of the plurality of data points of the future window cross the indicator threshold 406. By way of further example, the data server 305 can determine an aggregate value for the future window and evaluate the aggregate value in relation to the threshold. The aggregate value can be, for example, a mean, median, mode, maximum, minimum, or the like.

At block 606, the data server 305 produces resultant data indicative of absolute trend significance. The resultant data can include, for example, any of the data or metrics described above with respect to the block 604. In a typical embodiment, the resultant data can be used, for example, at the decision block 513 of FIG. 5A described above, when the data server 305 evaluates the criteria related to the absolute trend significance. In some embodiments, the criteria related to the absolute trend significance can be specified in terms of the resultant data. For example, the criteria related to the absolute trend significance can be satisfied in response to at least a specified minimum portion of the plurality of data points crossing the indicator threshold. The specified minimum portion could be expressed, for example, as a percentage (e.g., ten percent), as a raw number (e.g., at least one), or in other ways. After block 606, the process 600 ends.

Although the process 600 is presented herein as an illustrative example of determining absolute trend significance, it should be appreciated that absolute trend significance can also be determined in other ways without deviating from the principles of the present disclosure. For example, absolute trend detection can be performed without the model 420 in some embodiments. For example, the data server 305 can determine an aggregate value for the trend window 410, such as a mean, median, mode, maximum or minimum, and evaluate the aggregate value in relation to the indicator threshold. According to this example, the criteria related to the absolute trend significance, discussed above relative to the decision block 513 of FIG. 5A, might be satisfied in response to the aggregate value falling within a specified range of the indicator threshold 406 (e.g., within ten percent).

In addition, or alternatively, absolute trend detection can be performed with particular emphasis on vehicle or flight hours. For example, the future window used for predictions as described above can be expressed in terms of vehicle or flight hours. In that way, the model 420 can be used to predict problems or failures due, for example, to wear, damage, or the like.

FIG. 7 illustrates an example of a process 700 for determining relative trend significance according to some embodiments. In various embodiments, the process 700 can be performed as all or part of the block 509 of FIG. 5A. In certain embodiments, the process 700 can be executed, for example, by the data server 305 of FIG. 3, by the data terminal 303 of FIG. 3, by a component of the foregoing, or by another component. The process 700, or portions thereof, may be embodied in a software program stored on a non-transitory computer-readable storage medium that is executed by a processor of the data terminal 303 and a processor of the data server 305. The process 700 can also be executed generally by the HUMS 301 of FIG. 3. Although the process 700 can be executed by any number of different components, to simplify discussion, the process 700 will be described as being performed by the data server 305 and/or other particular components of FIG. 3. For simplicity of description, the process 700 will be described with reference to the graph 402 of FIG. 4.

At block 702, the data server 305 fits the historical window 412 to the cumulative distribution 424. In an example, the historical window 412 can be fit to a normal distribution as represented by the probability density function shown in Equation 2 below. A mean $\bar{x}$ of the historical window 412 and a standard deviation s of the historical window 412 can be computed as shown below in Equation 3 and Equation 4, respectively. It should be appreciated that other probability distributions may also be used without deviating from the principles of the present disclosure.

$$N(x) = \frac{1}{s\sqrt{2n}} e^{-\frac{1}{2}\left(\frac{x-\bar{x}}{s}\right)^2} \quad \text{Equation 2}$$

$$\bar{x} = \frac{\sum_{i=1}^{n} x}{n} \quad \text{Equation 3}$$

$$s = \sqrt{\frac{\sum_{i=1}^{n}(x_i - \bar{x})^2}{n-1}} \quad \text{Equation 4}$$

At block 704, the data server 305 compares the trend window 410 to the cumulative distribution 424 of the historical window 412. In an example, the block 704 can involve comparing values from the model 420 to the cumulative distribution 424, for example, by determining percentiles relative to the cumulative distribution 424. In another example, the block 704 can involve comparing individual samples of the trend window 410 to the cumulative distribution 424, for example, by determining percentiles relative to the cumulative distribution 424. In still another example, the block 704 can involve comparing aggregate values, such as mean, median, mode, maximum or minimum, for example, by determining percentiles for the aggregate values relative to the cumulative distribution 424. According to this example, the aggregate values can be determined with respect to the model 420 and/or with respect to the individual samples of the trend window 410.

At block 706, the data server 305 produces resultant data indicative of relative trend significance. The resultant data can include, for example, any of the data or metrics described above with respect to the block 704. In a typical embodiment, the resultant data can be used, for example, at the decision block 513 of FIG. 5A, when the data server 305 evaluates the criteria related to the relative trend significance. In some cases, both the resultant data and the criteria related to the relative trend significance can be specified in terms of a particular percentile or percentage of the historical window 412 according to the cumulative distribution 424 (e.g., 95, percent, 98 percent, etc.). In an example, in various cases, the criteria related to the relative trend significance can be satisfied in response to: (1) at least one value in the model 420 being greater than the particular percentage; (2) at least one sample in the trend window 410 being greater than the particular percentage; (3) at least a minimum number of samples in the trend window 410 being greater than the particular percentage; (4) a last or most recent sample in the trend window 410 being greater than the particular percentage; (5) a last or most recent value in the model 420 being greater than the particular percentage; (6) an aggregate value for the individual samples in the trend window 410 being greater than the particular percentage, where the aggregate value can be, for example, a mean, median, mode, maximum, minimum or the like; and/or (7) an aggregate value for the model 420 being greater than the particular percentage, where the aggregate value can be, for example, a mean, median, mode, maximum, minimum or the like. Other examples will be apparent to one skilled in the art after a detailed review of the present disclosure. After block 706, the process 700 ends.

Although the process 700 is presented herein as an illustrative example of determining relative trend significance, it should be appreciated that relative trend significance can also be determined in other ways without deviating from the principles of the present disclosure. In some embodiments, relative trend significance can be determined without fitting the historical window 412 to a probability distribution such as the cumulative distribution 424. In an example, the data server 305 can determine an aggregate value for the trend window 410 and an aggregate value for the historical window 412, where the aggregate values are means, medians, modes, maximums, minimums, or the like. According to this example, the data server 305 can compare the aggregate values and produce a comparison metric as resultant data. The comparison metric may be expressed in any suitable fashion such as, for example, a percentage increase or decrease in aggregate value when going from the historical window 412 to the trend window 410 (or vice versa). Continuing this example, the criteria related to the relative trend significance can be specified in terms of the comparison metric, where the criteria related to the relative trend significance is satisfied in response to the comparison metric meeting a comparison-metric threshold (e.g., the aggregate value for the trend window 410 is at least ten percent greater than the aggregate value for the historical window 412).

In addition, or alternatively, relative trend significance can be determined via modeling of the trend window 410 and the historical window 412. For example, a linear regression model can be generated for each of the trend window 410 and the historical window 412 in the general fashion described above relative to the block 502 of FIG. 5B. According to this example, the data server 305 can compare the linear regression models and produce a comparison metric as resultant data. The comparison metric can represent, for example, a comparison of slopes. The comparison metric may be expressed in any suitable fashion such as, for example, a percentage increase or decrease in slope when going from the historical window 412 to the trend window 410 (or vice versa). Continuing this example, the criteria related to the relative trend significance can be specified in terms of the comparison metric, where the criteria related to the relative trend significance is satisfied in response to the comparison metric meeting a comparison-metric threshold (e.g., the slope for the linear regression model of the trend window 410 is at least ten percent greater than the slope for the linear regression model the historical window 412).

In some embodiments, the cumulative distribution 424 described above relative to the process 700 can also be utilized as an additional validation or check for absolute trend significance during or in response to execution of the process 600 of FIG. 6. For example, the data server 305 can determine, based on the cumulative distribution 424 for the historical window 412, a probability that the indicator threshold 406 will be crossed. In general, a high value for this probability may make it less notable that the criteria related to absolute trend significance would be satisfied by the resultant data from the trend window 410. According to this example, if the probability that the indicator threshold 406 will be crossed satisfies specified criteria (e.g., greater than a configurable threshold such as ninety percent), such a trend indication in the trend window 410 can be deemed insignificant, or less significant. In this case, the trend indication in the trend window 410 can be disregarded, or considered as a non-trend, during the process 600 of FIG. 6 or during trend detection at the decision block 513 of FIG. 5A.

FIGS. 8A-C, 9A-B, 10 and 11A-B illustrate examples of trend analysis as described above relative to the processes 500 of FIG. 5A. Solely for illustrative purposes, these examples apply a combination of absolute trend significance using linear regression modeling as generally described with respect to the process 600 of FIG. 6 and relative trend significance using a normal probability distribution as generally described relative to the process 700 of FIG. 7. One skilled in the art will appreciate that many variations are contemplated without deviating from the principles described herein.

Figure 8A:
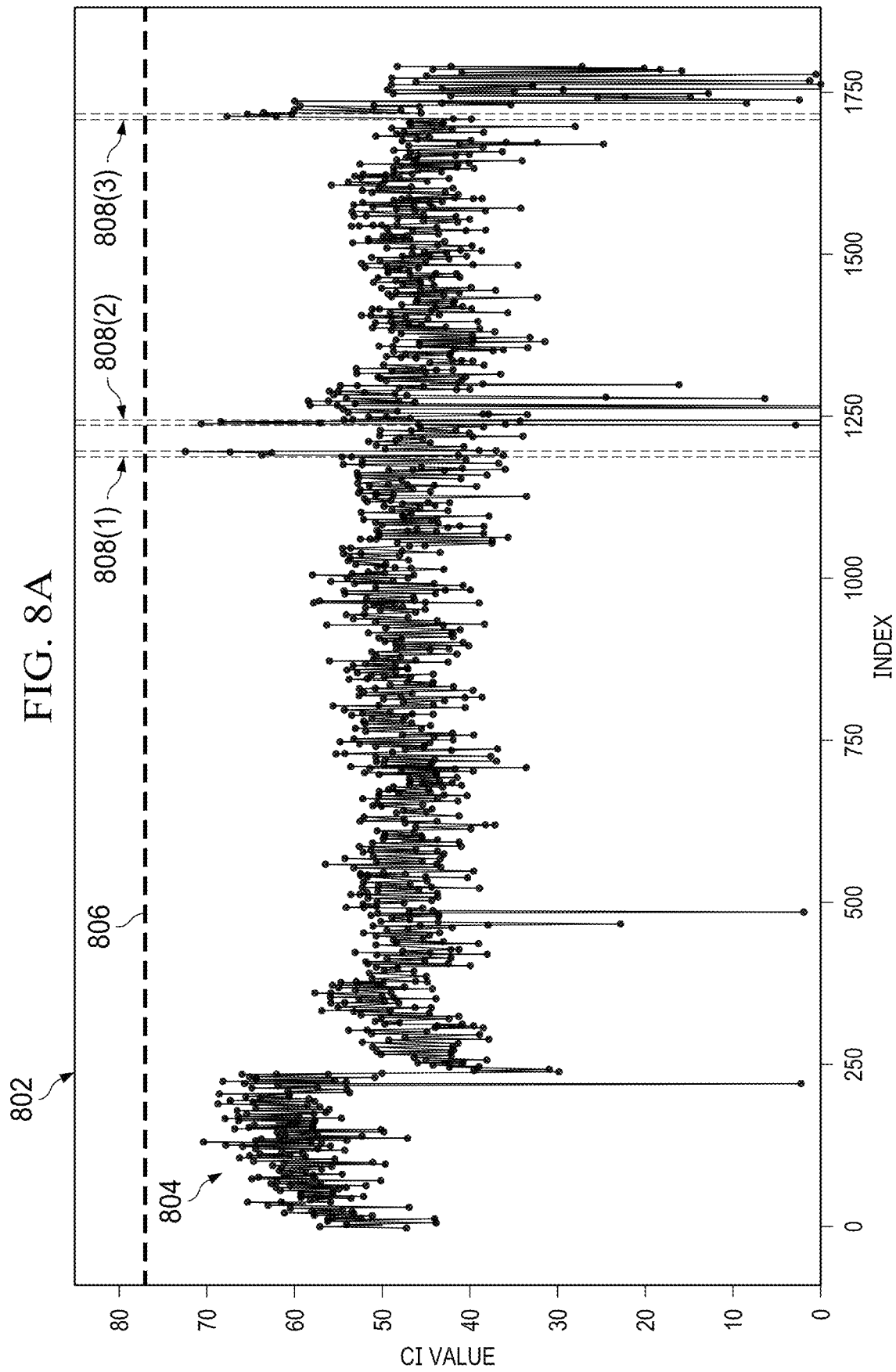
Figure 8C:
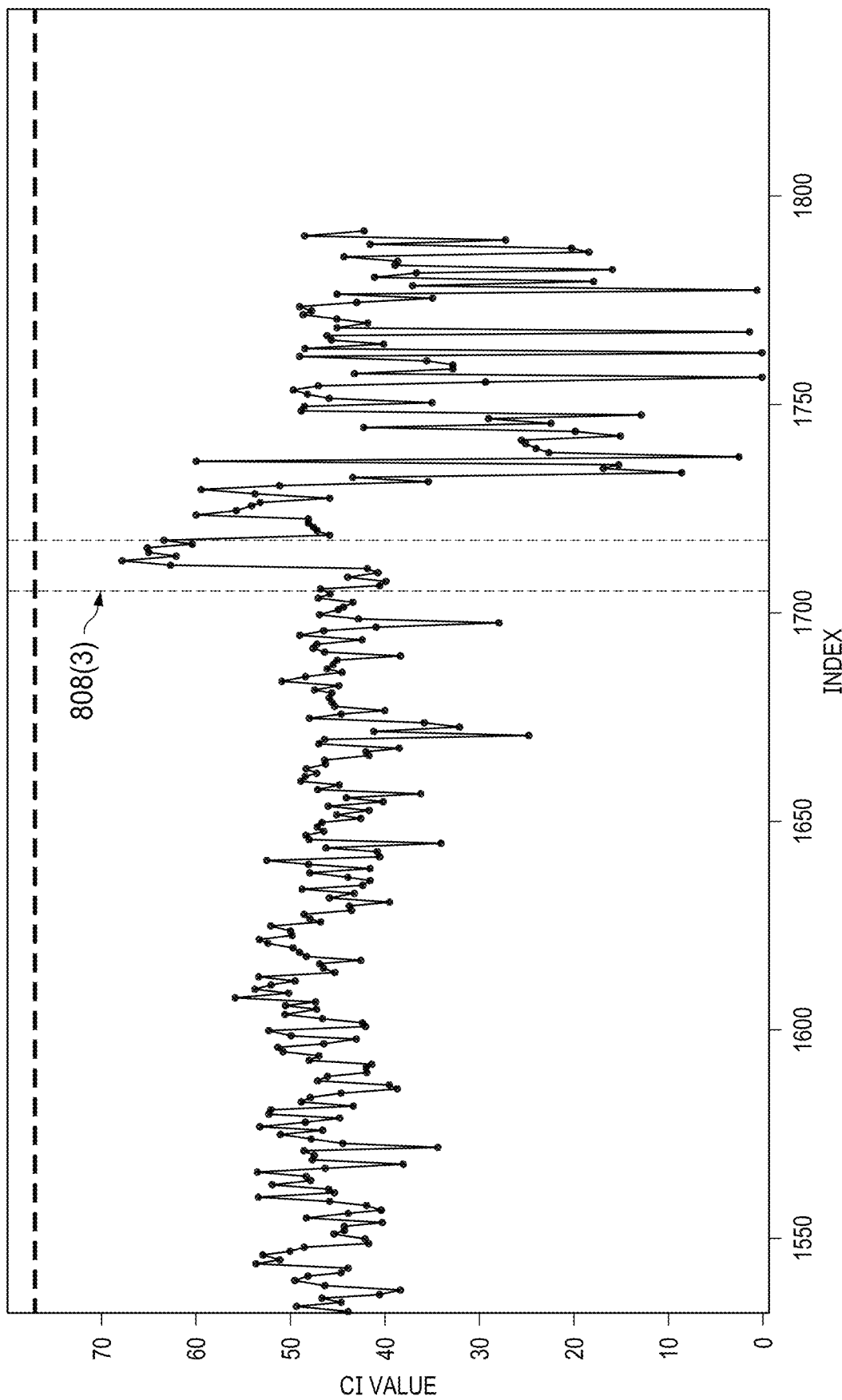

FIGS. 8A-C illustrate an example of trend analysis using condition indicator data 804. In particular, FIG. 8A is a graph 802 that includes the condition indicator data 804 and an indicator threshold 806. In addition, the graph 802 illustrates trend indications 808(1), 808(2) and 808(3). In various embodiments, the trend indications 808(1), 808(2) and 808(3) can represent trends that have been detected via execution, for example, of the processes 500, 600 and 700 of FIGS. 5, 6 and 7, respectively, on the condition indicator data 804. FIG. 8B shows a zoomed-in view of the trend indications 808(1) and 808(2), while FIG. 8C shows a zoomed-in view of the trend indication 808(3).

Figure 9A:
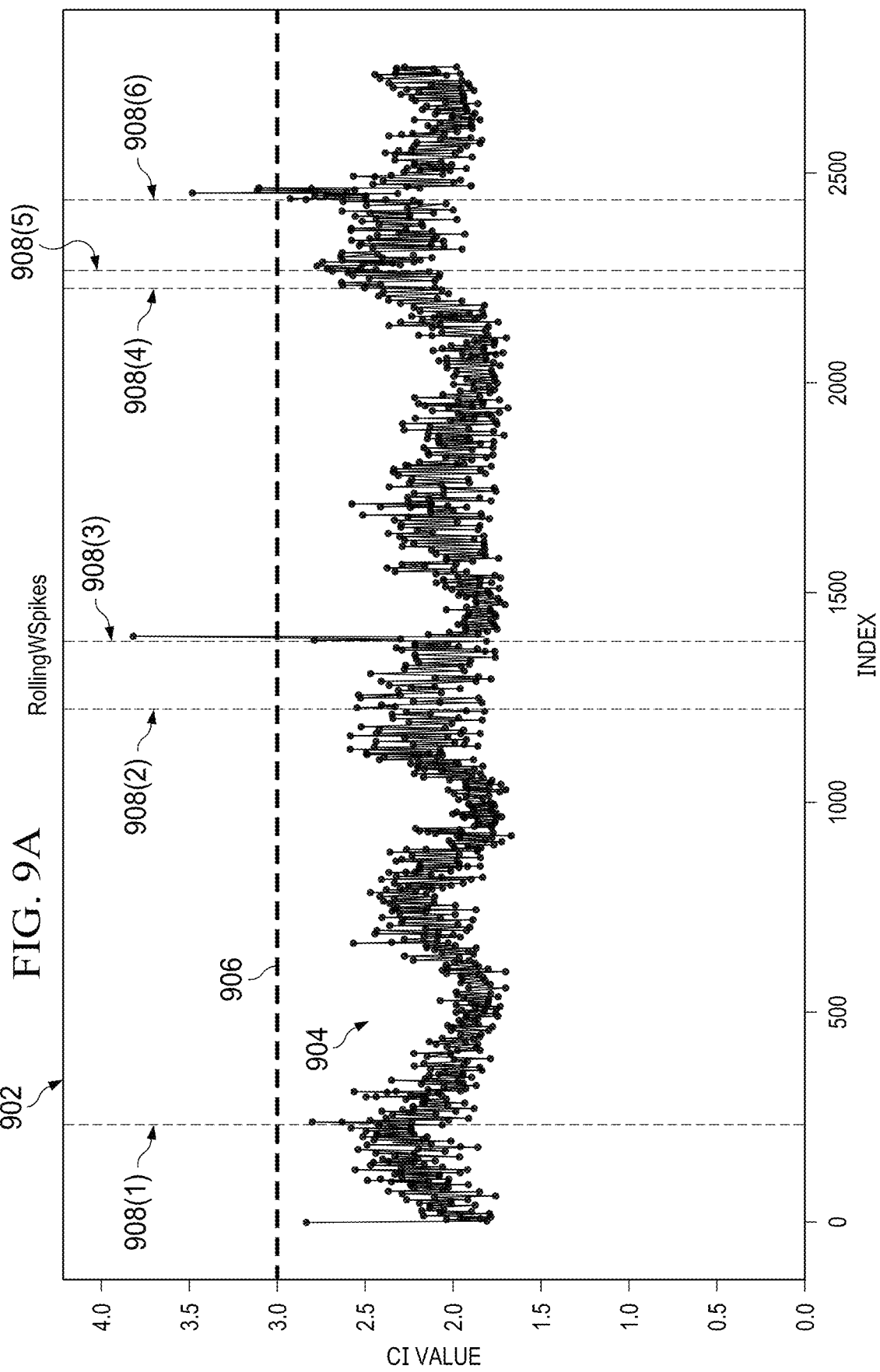

FIGS. 9A-B illustrate an example of trend analysis using condition indicator data 904. In particular, FIG. 9A is a graph 902 that includes the condition indicator data 904 and an indicator threshold 906. In addition, the graph 902 illustrates trend indications 908(1)-(6). In various embodiments, the trend indications 908(1)-(6) can represent trends that have been detected via execution, for example, of the processes 500, 600 and 700 of FIGS. 5, 6 and 7, respectively, on the condition indicator data 904. FIG. 9B shows a zoomed-in view of the trend indications 908(4)-(6).

Figure 10:
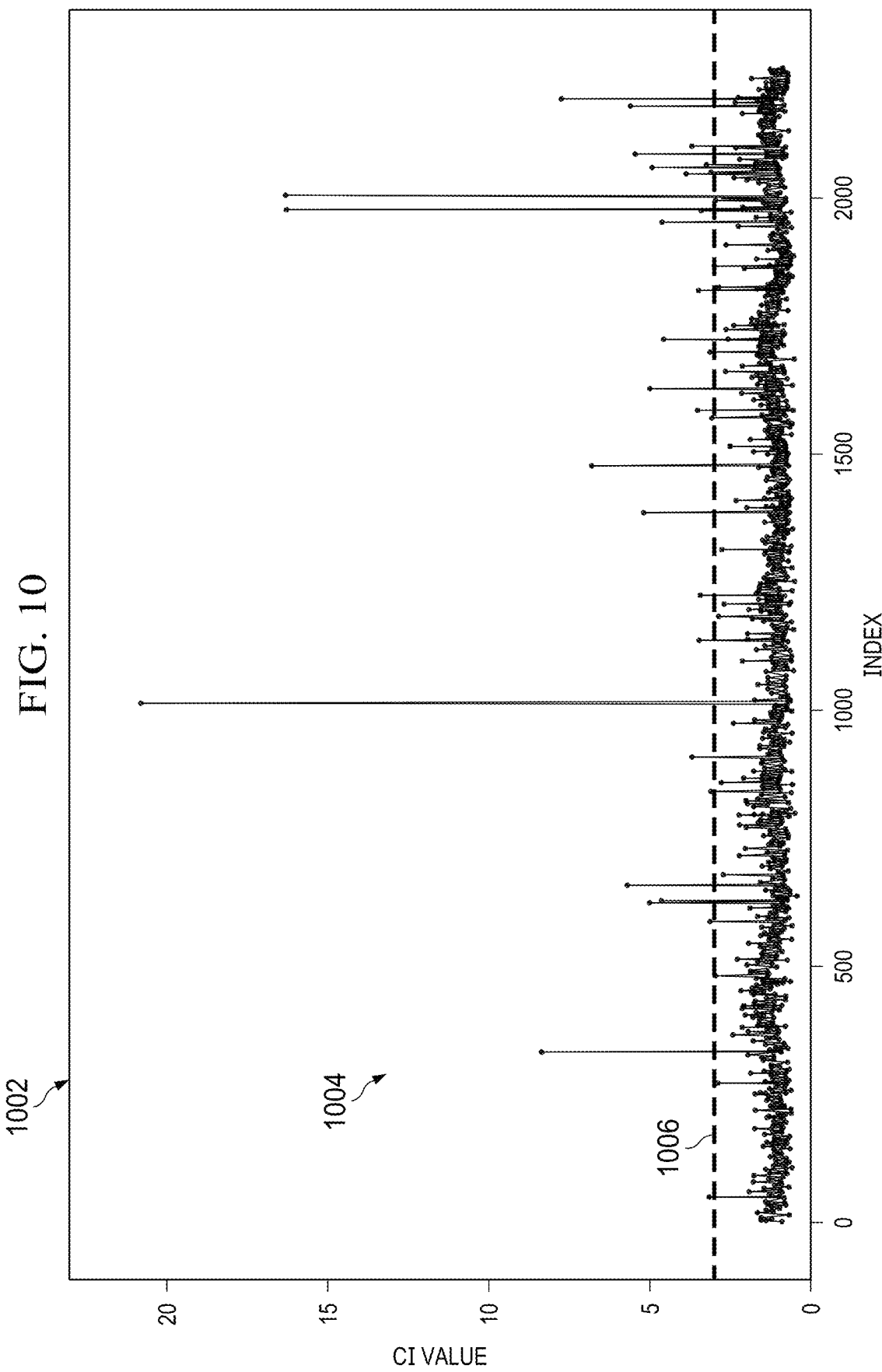
FIG. 10 illustrates an example of trend analysis using condition indicator data.

FIG. 10 illustrates an example of trend analysis using condition indicator data 1004. In particular, FIG. 10 is a graph 1002 that includes the condition indicator data 1004 and an indicator threshold 1006. No trend indications are shown in the graph 1002. In various embodiments, the graph 1002 illustrates certain advantages of using a quality analysis, as described with respect to the decision block 506 of FIG. 5B. The graph 1002 includes many one-time peaks or outliers. In a typical embodiment, a linear regression model that is generated based on a trend window which includes such one-time peaks would not satisfy quality criteria. In such an embodiment, the linear regression model could be disregarded as unsatisfactory for making predictions, thereby preventing a trend from being detected solely based on the one-time peaks.

Figure 11A:
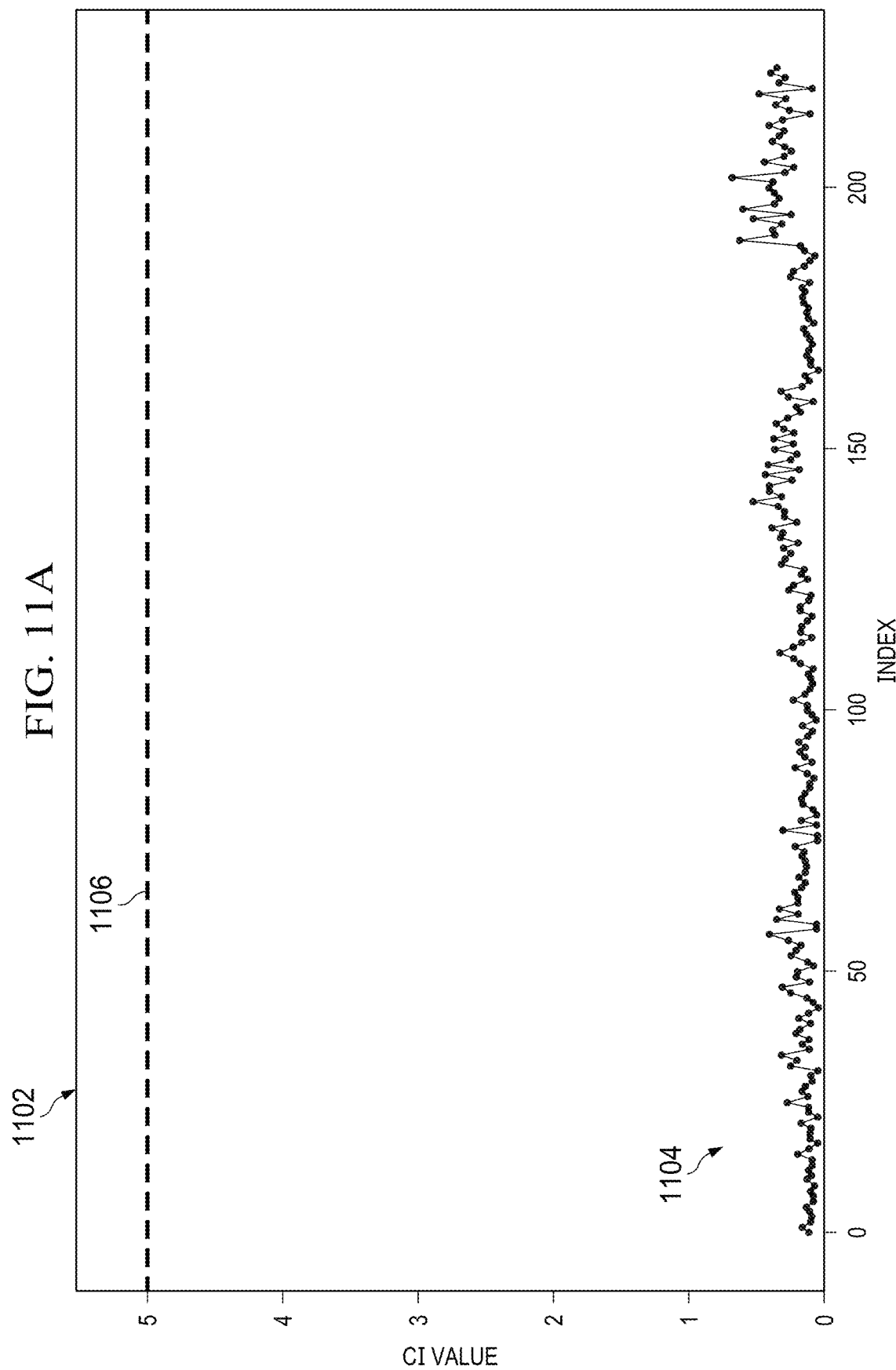
FIGS. 11A-B illustrate an example of trend analysis using condition indicator data.
Figure 11B:
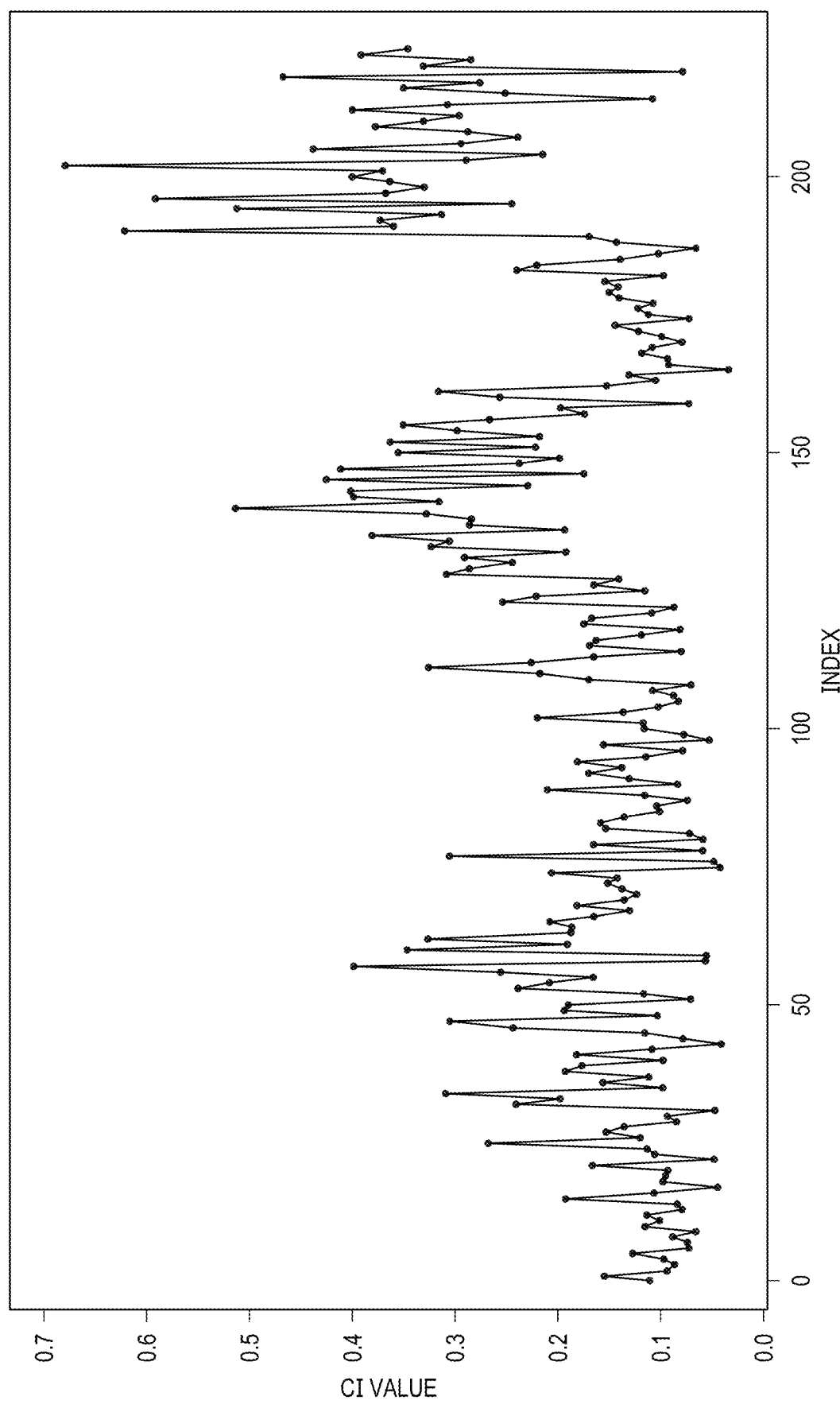

FIGS. 11A-B illustrate an example of trend analysis using condition indicator data 1104. In particular, FIG. 11A is a graph 1102 that includes the condition indicator data 1104 and an indicator threshold 1106. FIG. 11B is zoomed-in view of the graph 1102. No trend indications are shown in the graph 1102. In various embodiments, the graph 1102 illustrates certain advantages of using absolute trend detection in combination with relative trend detection. As better observed in the zoomed-in view of FIG. 11B, the condition indicator data 1104 skews upward on many occasions and thus may, at times, achieve relative trend significance. However, as better illustrated in FIG. 11A, the condition indicator data 1104 never approaches the indicator threshold 1106. Therefore, in the example of FIGS. 11A-B, absolute trend significance can be used to prevent trends from being detected when values suddenly skew upwards but are still quite distant from the indicator threshold 1106.

Although trends are periodically described by way of illustration as being upward or downward trends in particular examples, one of ordinary skill in the art will appreciate that the same principles can also be applied to trends in the reverse direction from that which is described.

Figure 12:
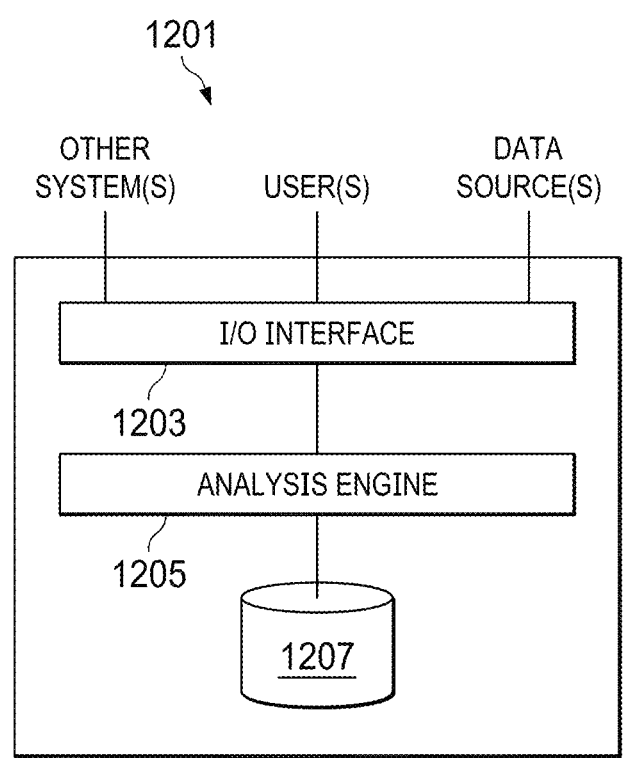
FIG. 12 illustrates an example of a computer system that may be used to implement a system, data terminal, or data server.

FIG. 12 is a diagram illustrating a computer system 1201 that may be used to implement a system, data terminal, or data server according to some embodiments. The computer system 1201 can include an input/output (I/O) interface 1203, an analysis engine 1205, and a database 1207. Alternative embodiments can combine or distribute the I/O interface 1203, the analysis engine 1205, and the database 1207, as desired. Embodiments of the computer system 1201 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 1203 can provide a communication link between external users, systems, and data sources and components of the computer system 1201. The I/O interface 1203 can be configured for allowing one or more users to input information to the computer system 1201 via any known input device. Examples can include a keyboard, mouse, touch screen, and/or any other desired input device. The I/O interface 1203 can be configured for allowing one or more users to receive information output from the computer system 1201 via any known output device. Examples can include a display monitor, a printer, cockpit display, and/or any other desired output device. The I/O interface 1203 can be configured for allowing other systems to communicate with the computer system 1201. For example, the I/O interface 1203 can allow one or more remote computer(s) to access information, input information, and/or remotely instruct the computer system 1201 to perform one or more of the tasks described herein. The I/O interface 1203 can be configured for allowing communication with one or more remote data sources. For example, the I/O interface 1203 can allow one or more remote data source(s) to access information, input information, and/or remotely instruct the computer system 1201 to perform one or more of the tasks described herein.

The database 1207 provides persistent data storage for the computer system 1201. Although the term "database" is primarily used, a memory or other suitable data storage arrangement may provide the functionality of the database 1207. In alternative embodiments, the database 1207 can be integral to or separate from the computer system 1201 and can operate on one or more computers. The database 1207 preferably provides non-volatile data storage for any information suitable to support the operation of the fly-by-wire flight control system 201 and the process 500, including various types of data discussed further herein. The analysis engine 1205 can include various combinations of one or more processors, memories, and software components.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof.

In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language. The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. For example, although various embodiments have been described herein relative to a vehicle, principles disclosed herein can also be applied to machines other than vehicles. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising:
    acquiring a current condition indicator of a condition indicator set associated with an operating condition of a machine, the condition indicator set indicating sensor readings associated with an operating element of the machine under the operating condition;
    determining, by a data server, a relative trend significance over a trend window of the condition indicator set using data related to an evaluation of the trend window in relation to a historical window of the condition indicator set, the historical window spanning a period prior to a start of the trend window;
    determining, by the data server, an absolute trend significance over the trend window using data related to an evaluation of the trend window in relation to an indicator threshold, wherein the determining the absolute trend significance comprises determining how many of a plurality of predicted data points of a future window of the condition indicator set cross the indicator threshold;
    determining, by the data server, whether trend criteria associated with the operating element is satisfied, wherein the trend criteria comprises criteria related to the relative trend significance and criteria related to the absolute trend significance, and wherein the criteria related to the absolute trend significance is satisfied in response to at least a specified minimum portion of the plurality of predicted data points crossing the indicator threshold; and executing, by the data server, an alerting process in response to the determining that the trend criteria is satisfied.

2. The method of claim 1 comprising:
generating a model of the trend window; and
wherein the determining the relative trend significance comprises comparing one or more values from the model to the historical window.

3. The method of claim 2 comprising:
analyzing a quality of the model, the analyzing yielding a quality metric; and
causing alert suppression responsive to the quality metric not satisfying quality criteria.

4. The method of claim 1 comprising:
generating a linear regression model of the trend window;
analyzing a quality of the linear regression model using a coefficient of determination; and
causing alert suppression responsive to the coefficient of determination not satisfying quality criteria.

5. The method of claim 1, wherein the determining the relative trend significance comprises fitting the historical window to a probability distribution.

6. The method of claim 5, wherein the criteria related to the relative trend significance is satisfied in response to at least one of the following:
at least one value in a model of the trend window is greater than a specified percentage of the historical window according to the probability distribution; and
a most recent value in a model of the trend window is greater than a specified percentage of the historical window according to the probability distribution.

7. The method of claim 5; wherein the criteria related to the relative trend significance is satisfied in response to at least one of the following:
at least one sample in the trend window is greater than a specified percentage of the historical window according to the probability distribution;
at least a minimum number of samples in the trend window are greater than a specified percentage of the historical window according to the probability distribution; and
a most recent sample in the trend window is greater than a specified percentage of the historical window according to the probability distribution.

8. The method of claim 5, wherein the criteria related to the relative trend significance is satisfied in response to at least one of the following:
an aggregate value for individual samples of the trend window is greater than a specified percentage of the historical window according to the probability distribution, wherein the aggregate value is selected from the group consisting of minimum, maximum, mean, median, and mode; and
an aggregate value for a model of the trend window is greater than a specified percentage of the historical window according to the probability distribution, wherein the aggregate value is selected from the group consisting of minimum, maximum, mean, median, and mode.

9. The method of claim 5, wherein the probability distribution comprises a normal probability distribution.

10. The method of claim 1, wherein:
the determining the relative trend significance comprises:
determining a first aggregate value for the trend window and a second aggregate value for the historical window; and
comparing the first aggregate value to the second aggregate value, the comparing yielding a comparison metric; and
the criteria related to the relative trend significance is satisfied in response to the comparison metric meeting a comparison-metric threshold.

11. The method of claim 1 comprising:
generating a first linear regression model for the trend window;
generating a second linear regression model for the historical window;
wherein the determining the relative trend significance comprise comparing a slope of the first linear regression model to a slope of the second linear regression model, the comparing yielding a comparison metric; and
wherein the criteria related to the relative trend significance is satisfied in response to the comparison metric meeting a comparison-metric threshold.

12. The method of claim 1, wherein the trend window and the historical window are non-overlapping windows.

13. The method of claim 1, wherein the plurality of predicted data points of the future window of the condition indicator set are predicted using a model of the trend window.

14. The method of claim 1, comprising:
determining a trend indication in the trend window responsive to the determining how many of the plurality of predicted data points cross the indicator threshold;
determining, based on a probability distribution of the historical window, a probability of crossing the indicator threshold; and
disregarding the trend indication in response to the probability satisfying specified criteria.

15. The method of claim 1, wherein:
the determining the absolute trend significance comprises determining an aggregate value for the trend window, wherein the aggregate value is selected from the group consisting of mean, median, mode, maximum and minimum; and
the criteria related to the absolute trend significance is satisfied in response to the aggregate value falling within a specified range of the indicator threshold.

16. The method of claim 1, wherein the executing the alerting process comprises generating an alert signal.

17. A computer system comprising a processor and memory, wherein the processor and the memory in combination are operable to perform a method comprising:
acquiring a current condition indicator of a condition indicator set associated with an operating condition of a machine, the condition indicator set indicating sensor readings associated with an operating element of the machine under the operating condition;
determining a relative trend significance over a trend window of the condition indicator set using data related to an evaluation of the trend window in relation to a historical window of the condition indicator set, the historical window spanning a period prior to a start of the trend window;
determining an absolute trend significance over the trend window using data related to an evaluation of the trend window in relation to an indicator threshold, wherein the determining the absolute trend significance comprises determining how many of a plurality of predicted data points of a future window of the condition indicator set cross the indicator threshold;

determining whether trend criteria associated with the operating element is satisfied, wherein the trend criteria comprises criteria related to the relative trend significance and criteria related to the absolute trend significance, and wherein the criteria related to the absolute trend significance is satisfied in response to at least a specified minimum portion of the plurality of predicted data points crossing the indicator threshold; and executing an alerting process in response to the determining that the trend criteria is satisfied.

18. A computer-program product comprising a non-transitory computer-usable medium having computer-readable program code embodied therein, the computer-readable program code adapted to be executed to implement a method comprising:

acquiring a current condition indicator of a condition indicator set associated with an operating condition of a machine, the condition indicator set indicating sensor readings associated with an operating element of the machine under the operating condition;

determining a relative trend significance over a trend window of the condition indicator set using data related to an evaluation of the trend window in relation to a historical window of the condition indicator set, the historical window spanning a period prior to a start of the trend window;

determining an absolute trend significance over the trend window using data related to an evaluation of the trend window in relation to an indicator threshold, wherein the determining the absolute trend significance comprises determining how many of a plurality of predicted data points of a future window of the condition indicator set cross the indicator threshold;

determining whether trend criteria associated with the operating element is satisfied, wherein the trend criteria comprises criteria related to the relative trend significance and criteria related to the absolute trend significance, and wherein the criteria related to the absolute trend significance is satisfied in response to at least a specified minimum portion of the plurality of predicted data points crossing the indicator threshold; and executing an alerting process in response to the determining that the trend criteria is satisfied.

19. The computer-program product of claim 18, the method comprising:

generating a model of the trend window; and wherein the determining the relative trend significance comprises comparing one or more values from the model to the historical window.

20. The computer-program product of claim 19, the method comprising:

analyzing a quality of the model, the analyzing yielding a quality metric; and causing alert suppression responsive to the quality metric not satisfying quality criteria.

* * * * *